(12) United States Patent
Nicks et al.

(10) Patent No.: US 9,058,393 B1
(45) Date of Patent: *Jun. 16, 2015

(54) TOOLS FOR APPRAISING A DOMAIN NAME USING KEYWORD MONETARY VALUE DATA

(75) Inventors: Paul Nicks, Marion, IA (US); Patrick Lutwitze, Cedar Rapids, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/616,434

(22) Filed: Sep. 14, 2012

Related U.S. Application Data

(63) Continuation-in-part of application No. 12/894,519, filed on Sep. 30, 2010, now Pat. No. 8,515,969, which is a continuation-in-part of application No. 12/708,809, filed on Feb. 19, 2010, now Pat. No. 8,447,702.

(51) Int. Cl.
*G06F 17/30* (2006.01)
*G06F 17/27* (2006.01)
*G06Q 30/02* (2012.01)

(52) U.S. Cl.
CPC ...... *G06F 17/30867* (2013.01); *G06F 17/2705* (2013.01); *G06Q 30/0283* (2013.01); *G06Q 30/0278* (2013.01)

(58) Field of Classification Search
CPC .................................................. G06F 17/2705
USPC .......................................... 705/306; 707/944
See application file for complete search history.

(56) References Cited

U.S. PATENT DOCUMENTS

| | | | |
|---|---|---|---|
| 6,151,631 A | 11/2000 | Ansell et al. |
| 6,298,341 B1 | 10/2001 | Mann et al. |
| 6,332,158 B1 | 12/2001 | Risley et al. |
| 6,334,132 B1 | 12/2001 | Weeks |
| 6,446,133 B1 | 9/2002 | Tan et al. |
| 6,480,508 B1 | 11/2002 | Mwikalo et al. |

(Continued)

FOREIGN PATENT DOCUMENTS

WO    WO2005017762    2/2005

OTHER PUBLICATIONS

Apr. 15, 2013 Notice of Allowance in related U.S. Appl. No. 12/708,809, pp. 1-57.

(Continued)

*Primary Examiner* — Albert Phillips, III
(74) *Attorney, Agent, or Firm* — Karl A. Fazio

(57) ABSTRACT

Systems and methods of the present invention provide for storing one or more data records, comprising a text string and a monetary value associated with the text string, in a database. One or more server computers may receive an appraisal request for a domain name and identify one or more keywords in the domain name. The server(s) may then determine an existence of one or more matching data records wherein the text string in the record(s) match the identified keyword. If the matching data records exist, the server(s) may identify a keyword frequency count and a keyword monetary value for that keyword. A keyword appraisal value may be generated by dividing the keyword monetary value by the keyword frequency count. The appraisal value for all identified keywords may be added to the domain name appraisal and the domain name appraisal may be transmitted to a client computer.

18 Claims, 18 Drawing Sheets

(56) References Cited

U.S. PATENT DOCUMENTS

| | | | |
|---|---|---|---|
| 6,480,837 B1 | 11/2002 | Dutta | |
| 6,519,589 B2 | 2/2003 | Mann et al. | |
| 6,560,634 B1 | 5/2003 | Broadhurst | |
| 6,687,746 B1 | 2/2004 | Shuster et al. | |
| 6,745,248 B1 | 6/2004 | Gardos et al. | |
| 6,876,997 B1 | 4/2005 | Rorex et al. | |
| 6,880,007 B1 | 4/2005 | Gardos et al. | |
| 6,895,430 B1 | 5/2005 | Schneider | |
| 6,901,436 B1 | 5/2005 | Schneider | |
| 6,976,090 B2 | 12/2005 | Ben-Shaul et al. | |
| 7,188,138 B1 | 3/2007 | Schneider | |
| 7,467,140 B2 | 12/2008 | Monroe | |
| 7,472,160 B2 | 12/2008 | King et al. | |
| 7,523,310 B2 | 4/2009 | Narin et al. | |
| 7,565,630 B1 | 7/2009 | Kamvar et al. | |
| 7,606,858 B2 | 10/2009 | King et al. | |
| 7,664,831 B2 | 2/2010 | Cartmell et al. | |
| 7,689,458 B2 | 3/2010 | Heckerman et al. | |
| 7,711,850 B2 | 5/2010 | Ronen et al. | |
| 7,711,851 B2 | 5/2010 | Ronen et al. | |
| 7,788,130 B2 | 8/2010 | Feeley et al. | |
| 7,805,379 B1 | 9/2010 | Adkins, III et al. | |
| 8,015,006 B2 | 9/2011 | Kennewick et al. | |
| 8,117,339 B2 | 2/2012 | Adelman et al. | |
| 2002/0010795 A1 | 1/2002 | Brown | |
| 2002/0065903 A1 | 5/2002 | Fellman | |
| 2002/0091703 A1 | 7/2002 | Bayles | |
| 2002/0091827 A1 | 7/2002 | King et al. | |
| 2002/0178383 A1 | 11/2002 | Hrabik et al. | |
| 2002/0194373 A1 | 12/2002 | Choudhry | |
| 2003/0149690 A1 | 8/2003 | Kudlacik et al. | |
| 2004/0064561 A1 | 4/2004 | Parsons et al. | |
| 2004/0083306 A1 | 4/2004 | Gloe | |
| 2004/0093331 A1 | 5/2004 | Garner et al. | |
| 2004/0199493 A1 | 10/2004 | Ruiz et al. | |
| 2004/0199520 A1 | 10/2004 | Ruiz et al. | |
| 2005/0055299 A1 | 3/2005 | Chambers et al. | |
| 2005/0125451 A1 | 6/2005 | Mooney | |
| 2005/0165904 A1 | 7/2005 | Mooney | |
| 2005/0172031 A1 | 8/2005 | Adelman | |
| 2005/0273344 A1 | 12/2005 | Lee et al. | |
| 2005/0289242 A1 | 12/2005 | Ruiz | |
| 2006/0004784 A1 | 1/2006 | Ableman | |
| 2006/0011720 A1 | 1/2006 | Call | |
| 2006/0031315 A1 | 2/2006 | Fenton et al. | |
| 2006/0101113 A1 | 5/2006 | Lemson et al. | |
| 2006/0101155 A1 | 5/2006 | Damour et al. | |
| 2006/0122889 A1 | 6/2006 | Burdick et al. | |
| 2006/0161682 A1 | 7/2006 | King et al. | |
| 2006/0271668 A1 | 11/2006 | Parsons et al. | |
| 2006/0287936 A1 | 12/2006 | Jacobson | |
| 2007/0067465 A1 | 3/2007 | Blinn et al. | |
| 2007/0083652 A1 | 4/2007 | King et al. | |
| 2007/0299682 A1 | 12/2007 | Roth et al. | |
| 2007/0299815 A1 | 12/2007 | Starbuck et al. | |
| 2008/0005312 A1 | 1/2008 | Boss et al. | |
| 2008/0027809 A1 | 1/2008 | Storm | |
| 2008/0034211 A1 | 2/2008 | Shull | |
| 2008/0059348 A1 | 3/2008 | Glassman et al. | |
| 2008/0065974 A1 | 3/2008 | Campbell | |
| 2008/0126232 A1 | 5/2008 | Lee | |
| 2008/0201487 A1 | 8/2008 | Blinn et al. | |
| 2008/0222125 A1 | 9/2008 | Chowdhury | |
| 2008/0229430 A1 | 9/2008 | Kargman | |
| 2008/0235383 A1 | 9/2008 | Schneider | |
| 2008/0313229 A1 | 12/2008 | Taswell | |
| 2009/0119198 A1 | 5/2009 | Manriquez et al. | |
| 2009/0171678 A1 | 7/2009 | Zimmerman et al. | |
| 2009/0171823 A1 | 7/2009 | Zimmerman et al. | |
| 2009/0216577 A1 | 8/2009 | Killebrew | |
| 2009/0241066 A1 | 9/2009 | Costello | |
| 2009/0248625 A1 | 10/2009 | Adelman et al. | |
| 2009/0248734 A1 | 10/2009 | Adelman et al. | |
| 2009/0248735 A1 | 10/2009 | Adelman et al. | |
| 2009/0248736 A1 | 10/2009 | Adelman et al. | |
| 2009/0254545 A1 | 10/2009 | Fisken | |
| 2009/0254572 A1 | 10/2009 | Redlich et al. | |
| 2009/0265415 A1 | 10/2009 | Harry | |
| 2009/0327231 A1 | 12/2009 | Zappa et al. | |
| 2010/0058210 A1 | 3/2010 | Johnson | |
| 2010/0070448 A1 | 3/2010 | Omoigui | |
| 2010/0114879 A1 | 5/2010 | Zhong et al. | |
| 2010/0145678 A1 | 6/2010 | Csomai et al. | |
| 2010/0274668 A1 | 10/2010 | Langston et al. | |
| 2011/0087769 A1 | 4/2011 | Holmes et al. | |
| 2012/0047577 A1 | 2/2012 | Costinsky | |

OTHER PUBLICATIONS

Jun. 25, 2013 Notice of Allowance in related U.S. Appl. No. 12/894,519, pp. 1-30.
Keywords—the Most Important Item in SEO, Mar. 23, 2007, pp. 1-4.
Domain Appraisal, Mar. 3, 2009, pp. 1-7.
LeapFish Free Domain Name Appraisal: Find Domain Worth, May 19, 2006, pp. 1-4.
Morgan, Do You Really Understand Domain Value? Aug. 16, 2009, pp. 1-7.
Pixelrage, The Only Domain Name Appraisal Guide You'll Ever Need, Sep. 15, 2008, pp. 1-6.
High Value Domain Yard, Apr. 3, 2009, pp. 1-5.
Chef Patrick, What Makes a Premium Domain Name, Oct. 1, 2008, pp. 1-4.
Douglas, Why the Live Domain Auction Bombed (and Why I'm Not Surprised)—Domain Name Wire, Comment 21, Feb. 4, 2009, pp. 1-7.
Kevinfrost, Domain Name Investing: the Easiest Way to Make Money Online?, Apr. 12, 2010, pp. 1-7.
EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword .com Domains Worth More than $100, Feb. 21, 2009, pp. 1-5.
Information retrieval—Wikipedia, the free encyclopedia, Nov. 10, 2009, pp. 1-8.
Laidlaw, What's Your Web Site Worth, May 7, 2008, pp. 1-22.
Domain Name Appraisal FAQ, Feb. 26, 2009, pp. 1-2.
Jun. 7, 2013 response to Mar. 7, 2013 office action in related U.S. Appl. No. 12/894,519, pp. 1-30.
Internet print-out of http://web.archive.org/web/20000901042248/http://www.datex.net/ecommerce/glossary.htm, Internet archive of datex.net, Sep. 1, 2000, pp. 1-3.
GHG Internet Services, "Domain Name Registration Information", pp. 1 and 2, 2002 pp. 1-2.
PR Newswire Association, WiredAlumni.com Offeres Free Online Alumni Communities, Jun. 1, 2000, pp. 1-2.
Mockapetris, RFC 1035, Domain Names—Implementation and Specification, Nov. 1, 1987, pp. 1-55.
Moffat, RSS—A Primer for Publihsers & Content Proivders, p. 3, Aug. 20, 2003.
"Domain name Hijacking: Incidents, Threats, Risks, and Remedial Actions", A Report from the ICANN Security and Stability Advisory Committee, pp. 1-48, Jul. 2005.
Van Couvering, DomainsBot Investigation#2, Jan. 22, 2006, pp. 1-6.
Fusu introduces Domain Stock Exchange in private beta, http://www.domainnamenews.com/domain-sales/fusuintroduces-domain-stock-exchange-in-private-beta/885, Oct. 17, 2007, pp. 1-10.
Dnxpert, Fusu Domain StockExchange in Beta, http://www.dnxpert.com/2007/10/18/fusu-domain-stock-exchange-in-beta/, Oct. 17, 2007, pp. 1-10.
Business EditorslHigh Tech Writers "Network Solutions' Affiliate Program to Offer Expanded Internet Identity Services Through Storefront", Business Wire, May 11. 2000, p. 1.
Ramaswamy Chandramouli and Scott Rose "Challenges in Securing the Domain Name System", IEEE Security & Privacy, 2006, pp. 84-87.
Feb. 10, 2014 Notice of Allowance in related U.S. Appl. No. 12/894,558, pp. 1-27.

TOOLS FOR APPRAISING A DOMAIN NAME USING KEYWORD MONETARY VALUE DATA

CROSS REFERENCE TO RELATED PATENT APPLICATIONS

This patent application is a continuation-in-part of the following previously-filed patent applications:

U.S. patent application Ser. No. 12/708,752, to Paul Nicks, with a filing date Feb. 19, 2010 and titled "SEMANTIC DOMAIN NAME SPINNING."

U.S. patent application Ser. No. 12/708,775, to Paul Nicks, with a filing date Feb. 19, 2010 and titled "AUTOMATED SEMANTIC DOMAIN SPINNING TOOLS."

U.S. patent application Ser. No. 12/708,793, to Paul Nicks, with a filing date Feb. 19, 2010 and titled "APPRAISING DOMAIN NAMES USING COMPARATIVE DATA."

U.S. patent application Ser. No. 12/708,809, to Paul Nicks, with a filing date Feb. 19, 2010 and titled "DOMAIN APPRAISAL ALGORITHM."

U.S. patent application Ser. No. 12/894,519, "SPLITTING A CHARACTER STRING INTO KEYWORD STRINGS."

U.S. patent application Ser. No. 12/894,558, "CALCULATING RELIABILITY SCORES FROM WORD SPLITTING."

This patent application is related to the following concurrently-filed patent application:

U.S. patent application Ser. No. 13/616,505, "APPRAISING A DOMAIN NAME USING KEYWORD MONETARY VALUE DATA."

The subject matter of all patent applications is commonly owned and assigned to The Go Daddy Group, Inc. All prior applications are incorporated herein in their entirety by reference

FIELD OF THE INVENTION

The present inventions generally relate to the field of domain names and specifically to the field of domain name appraisal.

SUMMARY OF THE INVENTION

The present invention provides methods and systems for storing, on a database running on one or more server computers communicatively coupled to a network, one or more data records, each of the one or more data records comprising a text string and a monetary value associated with the text string. The one or more server computers may also be running one or more domain name appraisal modules configured to accomplish the following steps.

The one or more server computers may receive an appraisal request for a domain name and set an appraisal value of the domain name to 0. The server(s) may then identify a keyword within the domain name and determine if one or more matching data records wherein said text string matches said keyword exist within the database. If the matching data records do not exist in the database, the server(s) may generate a keyword appraisal value of 0.

However, if the matching data records do exist in the database, the server(s) may identify a keyword frequency count comprising a number of the one or more matching data records found in the database; identify a keyword monetary value comprising a sum of the monetary value associated with the text string, for all of the matching data records; generate a keyword appraisal value for the keyword comprising a quotient calculated by dividing the keyword monetary value by the keyword frequency count; and add the keyword appraisal value for all identified keywords to the appraisal value of the domain name. Once all keyword appraisal values have been added to the appraisal value of the domain name, the server(s) may transmit the total appraisal value to one or more client computers communicatively coupled to the network.

The above features and advantages of the present invention will be better understood from the following detailed description taken in conjunction with the accompanying drawings.

DETAILED DESCRIPTION

Figure 1:
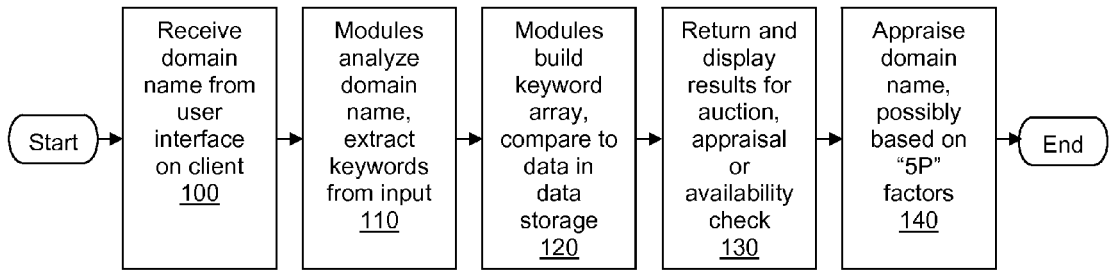
FIG. 1 is a flow diagram illustrating a possible embodiment of a method for semantic domain name spinning

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

A Method and System for Semantic Domain Name Spinning

Several different methods may be used to provide and manage the disclosed invention. In an example embodiment illustrated in FIG. 1, a user may enter a domain name into a user interface on a client, possibly seeking more information about the domain name, such as domain auction or other aftermarket information, domain appraisal or evaluation information, or information about the domain's availability (Step 100). Any combination of software modules used together with hardware on a server in a data center may receive and analyze the submitted information, possibly supplemented with additional information from data storage within the data center. One or more software modules may use this analysis to extract one or more keywords from the received domain name (Step 110). Using these one or more keywords, one or more modules on a communicatively coupled server or client may build a keyword array, and this keyword array may be compared to possible matches contained in a database within data storage, which may also be communicatively coupled to the server or client (Step 120). If a match is found, the match may be appended to the result set, with exact matches in top priority; otherwise, the result set may be returned to the user and displayed on the client for purposes of domain auction, domain aftermarket, domain appraisal or availability of the domain name (Step 130). An appraisal for valuation of the domain name may also be returned and displayed to the user on the client, possibly based on the "5P" appraisal factors, discussed in detail below (Step 140).

Figure 2:
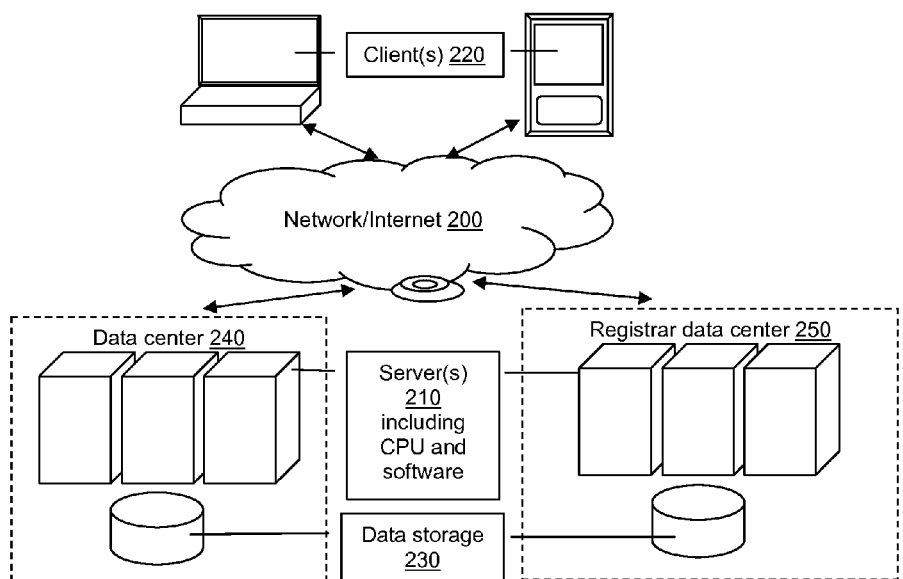
FIG. 2 illustrates a possible system for semantic domain name spinning and appraising a domain name.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution that may have occasion to seek information for domain spinning or appraisal.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such as way as to allow a user to enter into a user interface on the client 220, and for the server 210 to receive, the domain name to generate the keywords to search information in data storage 230 for domain spinning information related to domain aftermarket, domain appraisal, domain availability and/or accomplish any other methods disclosed herein.

Such server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the Internet, domain auction, aftermarket, availability or appraisal information, registrar domain information and/or other data requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The software modules used in the context of the current invention may be stored in the memory of—and run on—at least one server 210 or client 220. As a non-limiting example of such software modules, a keyword extraction module may be used to extract keywords from the domain name to retrieve and compare information stored in data storage 230 for purposes of domain auction, domain appraisal and/or domain availability. A domain appraisal module, or several related software modules working together (disclosed below), may likewise be used to appraise the valuation of the domain name, etc. The software modules may comprise software and/or scripts containing instructions that, when executed by a microprocessor on a server 210 or client 220, cause the microprocessor to accomplish the purpose of the module or the methods disclosed herein, in this example to extract keywords from a domain name, retrieve and compare related keyword and/or domain name information from data storage 230, appraise the valuation of the domain name and/or display this domain and other retrieved information to the user on a client 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

Figure 8:
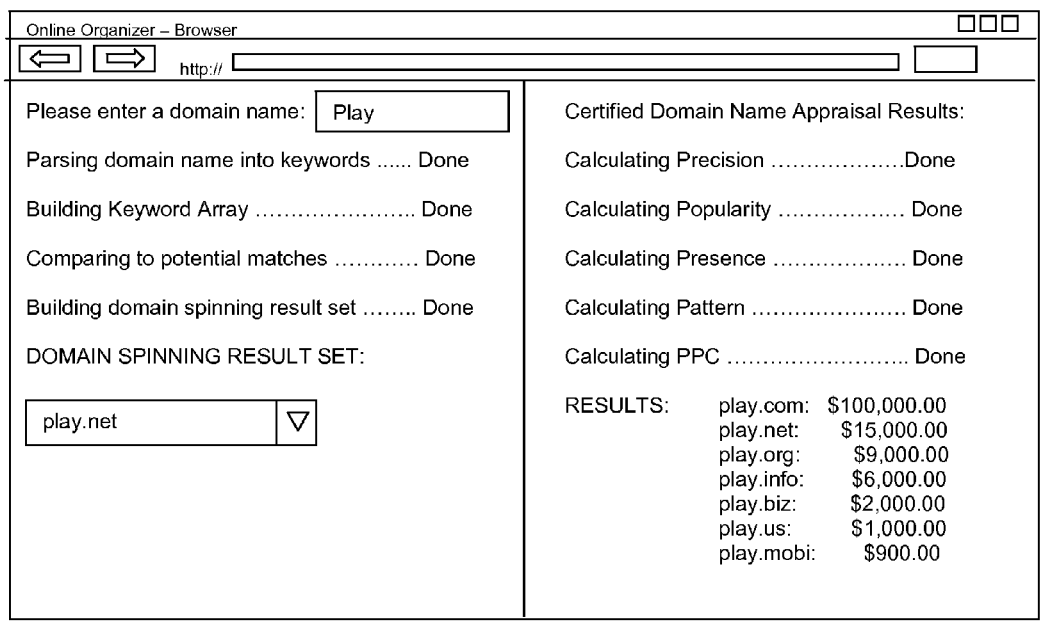
FIG. 8 illustrates a possible embodiment of an interface for displaying the results of the domain spinning and the certified domain appraisal process.

The user interface displayed on the client 220 or the server 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in FIG. 8, Touch interfaces, Conversational Interface Agents, Live User Interfaces (LUI), Command line interfaces, Noncommand user interfaces, Object-oriented User Interfaces (OOUI) or Voice user interfaces. The domain name information generated, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 and/or client 220 may be communicatively coupled to data storage 230 of domain name information, domain name appraisal information, domain name spinning information or any other information requested. The data storage 230 may be any computer components, devices, and/or recording media that may retain digital data used for computing for some interval of time. The storage may be capable of retaining stored content for the domain information or any other data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine domain names and keywords recognized by the scripting language, key words to be matched to those found in data storage, availability of domain names, comparisons to appraisals of other domain names or any other method steps disclosed herein.

Another environment similar to the data center 240 may also be used to access information about a domain name on a registrar's server 210 in a registrar's data center 250. As the user accesses information about a domain name, another command from the software modules may be used to redirect to a registrar's server 210 in a registrar's data center 250. This server may also contain software components which allow a data storage 230, either separate from or integrated into the registrar's server, to access information regarding domain name spinning and appraisal for the users. The registrar's server 210 may use the registrar's data storage 230 and software modules or components on the server 210 to search for information relating to the domain name spinning or appraisal as requested by the user. If such information is available, the software modules or components on the server 210 and/or registrar's server 210 may be used to forward this information from the data storage 230 to the user/potential customer. This information may also be forwarded to an email account of the user.

In a non-limiting example embodiment, the data center 240 and/or registrar data center 250 may provide hosting services for websites, services or software relating to the domain information, or any related hosted website including, but not limited to hosting one or more computers or servers in a data center 240/250 as well as providing the general infrastructure necessary to offer hosting services to Internet users including hardware, software, Internet web sites, hosting servers, and electronic communication means necessary to connect multiple computers and/or servers to the Internet or any other network 200. These data centers 240/250 or the related clients 220 may accept messages from text messages, SMS, web, mobile web, instant message, third party API projects or other third party applications.

In an example embodiment illustrated in FIG. 1, a domain name may be received via information entered into an interface on a client 220 operated by a user of the system. The system may then parse the domain name into keywords and build an array of similar keywords based on a semantic search.

Figure 3:
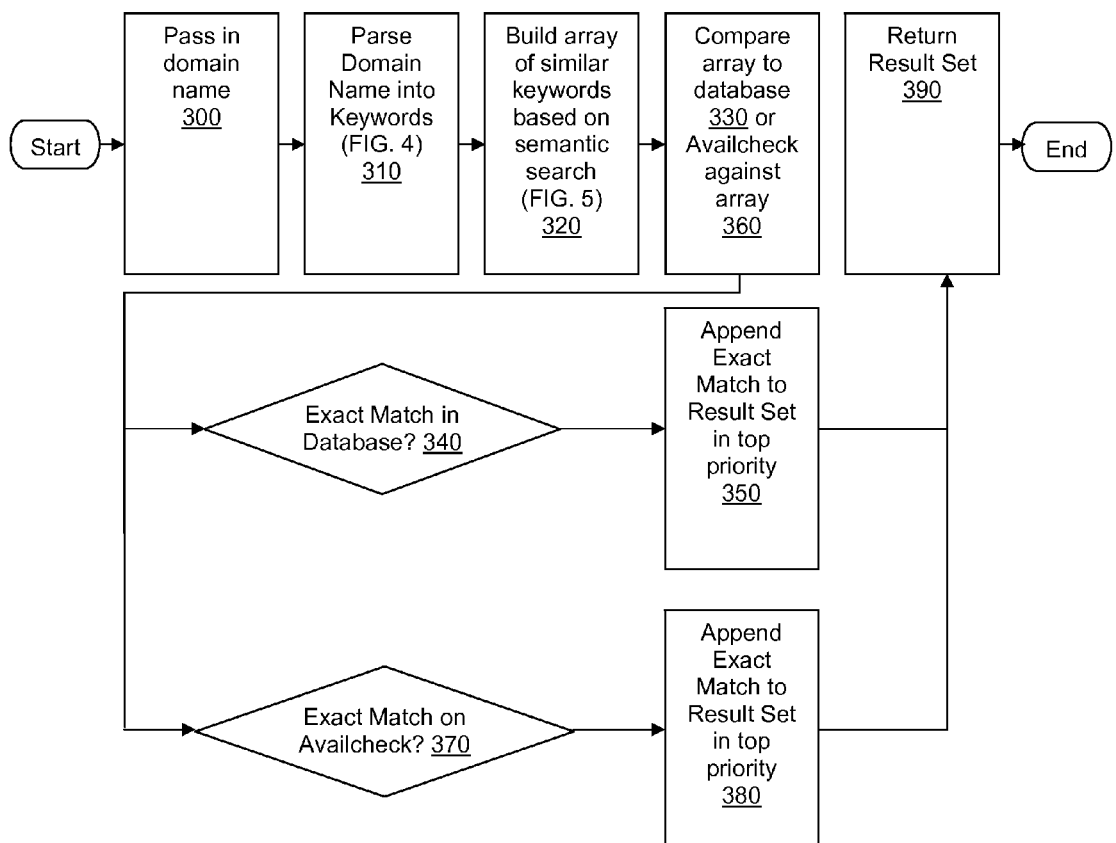
FIG. 3 is a flow diagram illustrating a possible embodiment of a method for semantic domain name spinning.

FIG. 3 shows that the embodiment illustrated in FIG. 1, as well as other disclosed embodiments, may include the steps of passing the domain name into the system (Step 300), parsing the domain name into keywords, as well as all subsequent steps described below associated with FIG. 4 (Step 310), building an array of similar keywords based on a semantic search, as well as all subsequent steps described below associated with FIG. 5 (Step 320) and comparing the keywords to return a result set (Step 390).

Two different comparisons may be made: First, in spinning the domain name, such as for auction, aftermarket or appraisal, the array of similar keywords based on the semantic search may be compared to information in data storage 230 such as a database (Step 330). If an exact match is found in the database (Step 340), the exact match may be appended to the result set in top priority (Step 350) and the result set, including the prioritized exact matches, may be returned (Step 390). In another embodiment, the array may be compared against one or more available domain names (Step 360). In spinning the domain name for a check against domain availability (Step 360), if an exact match is found in the array against a check for domain availability (Step 370), the exact match may be appended to the result set in top priority (Step 380) and the result set, including the prioritized exact matches, may be returned (Step 390). The returned result set may then be appraised for valuation of the domain name for the user (Step 140).

Figure 4:
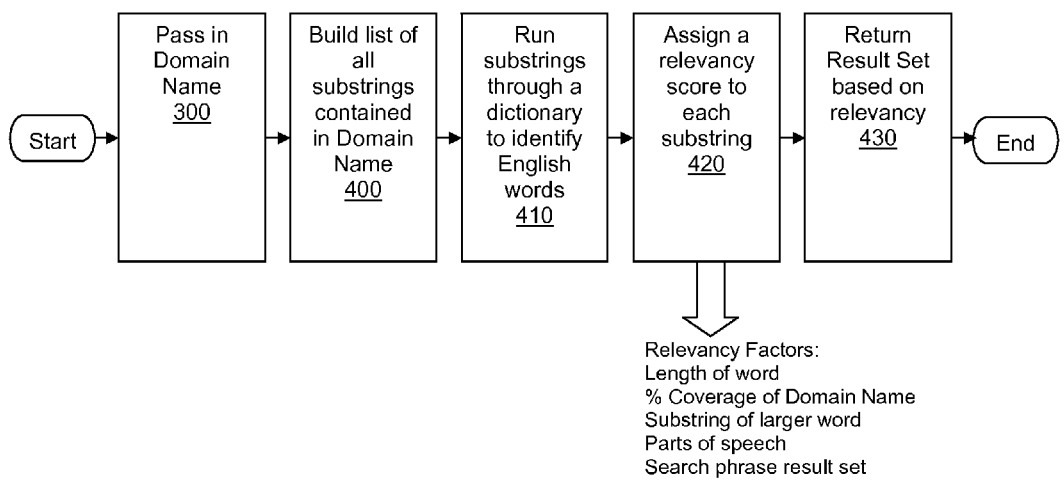
FIG. 4 is a flow diagram illustrating a possible embodiment of a method for semantic domain name spinning.

FIG. 4 shows that the embodiment illustrated in FIGS. 1 and 3, as well as other disclosed embodiments, may include the steps of passing the domain name in to the system (Step 300), building a list of all strings and/or substrings contained in the domain name (Step 400), running the strings and/or substrings through a dictionary to identify English words within the list of strings and/or substrings built from the domain name (Step 410), assigning a relevancy score to each string and/or substring (Step 420) and returning a result set based on the relevancy score assigned to each string and/or substring (Step 430). As previously disclosed, Steps 400-430, illustrated in FIG. 4, may be, but are not limited to, being sub-steps of parsing a domain name into keywords (Step 310).

The step of assigning a relevancy score to each string and/or substring (Step 420) may include, but are not limited to, several relevancy factors, including the length of the word, the percentage of coverage of the domain name, whether the substring is a substring of a larger word and/or string, the parts of speech associated with the string and/or substring or domain name and/or a search phrase result set.

Figure 5:
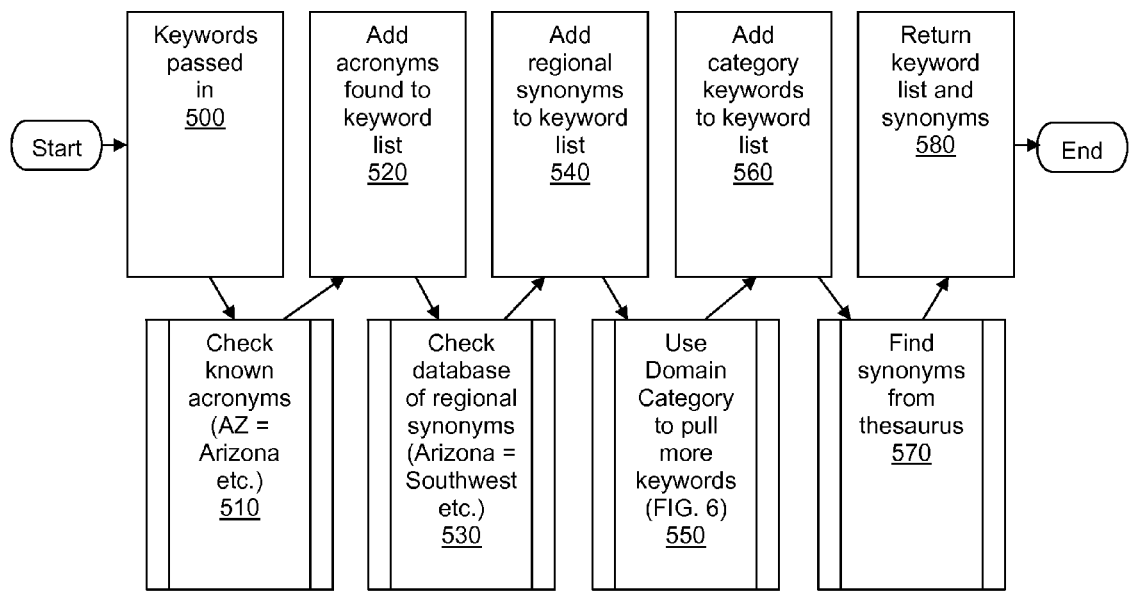
FIG. 5 is a flow diagram illustrating a possible embodiment of a method for semantic domain name spinning.

FIG. 5 shows that the embodiment illustrated in FIGS. 1 and 3, as well as other disclosed embodiments, may include the step of passing the domain name in to the system (Step 300). Passing in these keywords (Step 500) may allow additional acronyms, regional synonyms, domain category keywords and synonyms from a thesaurus to be added to the keyword list and synonyms. These additional tools may be used to build an array of similar keywords based on a semantic search (Step 320).

Once the keywords are passed in to the system (Step 500), the keywords and/or domain name may be checked for known acronyms or abbreviations (Step 510). As a non-limiting example, the keyword and/or domain name may recognize that ASU is an acronym for Arizona State University, or that AZ is an abbreviation for Arizona. Any acronyms and/or abbreviations found may then be added to the keyword list and/or array (Step 520).

Data storage 230, such as a database, may be used to check the domain name, each of the words in the list of keywords, substrings of the domain name/keywords, or the previously disclosed acronyms/abbreviations for matches of regional synonyms. As a non-limiting example, "Arizona State University," "Arizona," "ASU" and "AZ" may all be recognized as being synonymous with and/or associated with the word "Southwest." (Step 530). The regional synonyms may then be added to the keyword list (Step 540).

A series of domain categories may be established and used to pull more keywords, as well as all subsequent steps described below associated with FIG. 6 (Step 550). The category keywords pulled may then be added to the keyword list (Step 560). A thesaurus may then be used to find synonyms for the domain name, each of the words in the list of keywords, substrings of the domain name/keywords, or the previously disclosed acronyms/abbreviations. The keyword list, as well as any synonyms (regional or otherwise) and/or acronyms may then be returned (Step 580). As previously disclosed, Steps 500-580, illustrated in FIG. 5, may be, but are not limited to being sub-steps of building an array of similar keywords based on a semantic search (Step 320).

Figure 6:
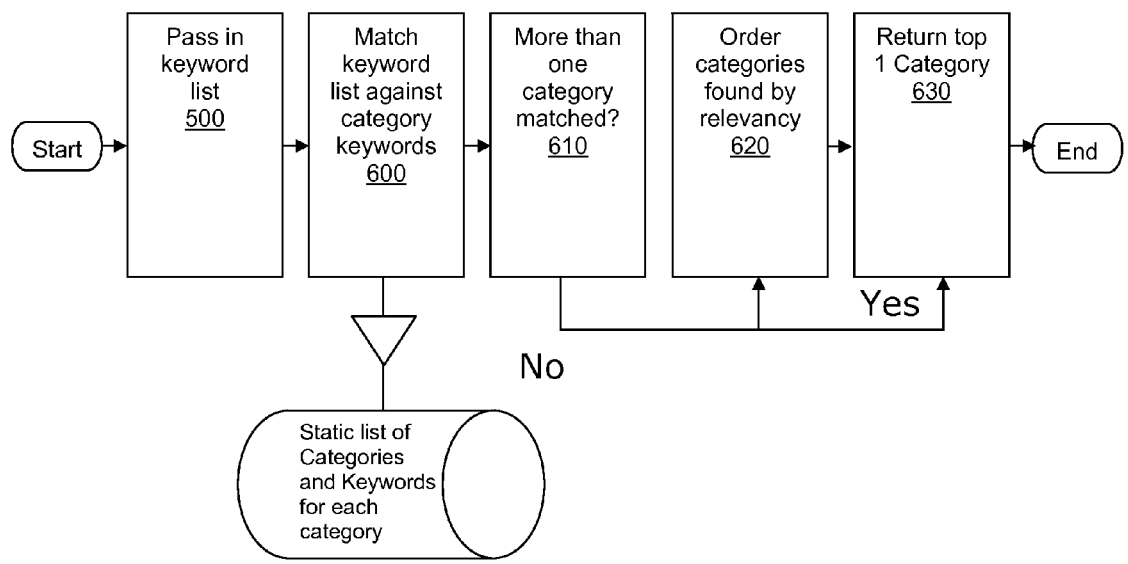
FIG. 6 is a flow diagram illustrating a possible embodiment of a method for semantic domain name spinning.

FIG. 6 shows that the embodiment illustrated in FIGS. 1, 3 and 5, as well as other disclosed embodiments, may include the steps of passing the domain name in to the system (Step 300). Once the domain name, list of keywords, acronyms/abbreviations and/or synonyms are passed in to the system (Step 500), these elements may be matched against one or more category keywords (Step 600). As seen in FIG. 6, these category keywords may be stored in data storage 230 such as a database containing a static list of categories and keywords for each category.

After matching the keyword list against the category keywords (Step 600), a determination may be made as to whether more than one category was matched (Step 610). If so, the categories found may be ordered by relevancy (Step 620). Whether or not more than one category was matched (Step 610), the top 1 category may be returned (Step 630). If more than one category was matched (Step 610), the top 1 category, as well as the categories ordered by relevancy, may also be returned (Step 630). As previously disclosed, Steps 600-630, illustrated in FIG. 6, may be, but are not limited to being sub-steps of using the domain name, list of keywords, acronyms/abbreviations and/or synonyms to pull additional keywords (Step 550).

The additional steps included in the embodiments illustrated in FIGS. 1-6 are not limited to the embodiment shown in FIG. 1, or their respective illustrated embodiments, and may be combined in several different orders and modified within multiple other disclosed embodiments. Likewise, the method steps disclosed herein may be accomplished by a software module executed on a server and/or client configured to accomplish that method step. As non-limiting examples, the method steps disclosed above may be accomplished by, but are not limited to a domain name keyword parsing software module, a keyword array building software module, a result set returning software module, an array and/or domain name comparison software module etc.

A Method and System for Domain Name Appraisal and Valuation

Several different methods may be used to provide and manage the disclosed invention. In an example embodiment illustrated in FIG. 7, a user may enter a domain name into a user interface on a client, possibly seeking more information about an appraisal or valuation of the domain name. In another embodiment, the domain name may be entered automatically into the system as a result of domain spinning, described in detail above. Any combination of software modules used together with hardware on a client 220 in a data center 240/250 may receive and analyze the submitted information from a user interface on a client 220, possibly supplemented by additional information from data storage 230 within one or more data centers 240/250 (as illustrated in FIG. 2, and described in detail above). The software modules may use this analysis to create an automated appraisal of a domain name for a certified appraisal process, possibly using an appraisal process algorithm, the appraisal process algorithm possibly contained within an appraisal software module.

Figure 7:
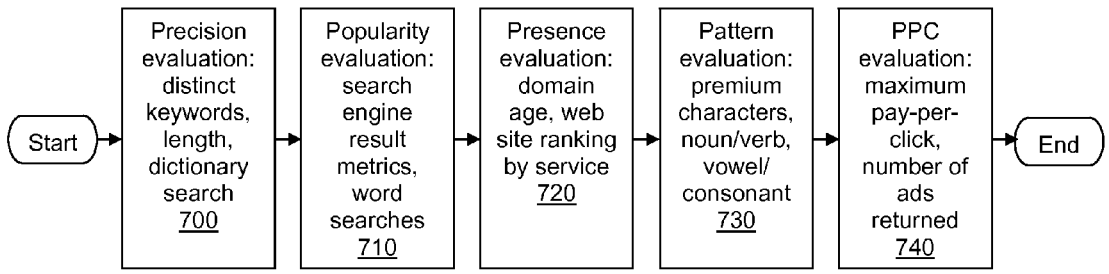
FIG. 7 is a flow diagram illustrating a possible embodiment of a method for appraising a domain name.

The appraisal may be accomplished, as seen in FIG. 7, by dividing the valuation of the domain into five logical groupings, including evaluation of "5 P's" related to the domain name. Evaluation of "precision" may include the number of distinct keywords found, the length of the domain name and the number of keywords found in the dictionary (Step 700). Evaluation of "popularity" may include various search engine search result metrics and tracking of words searched per month (Step 710). Evaluation of "presence" may include the age of the domain, and the rank of the web site according to web ranking services or software (Step 720). Evaluation of "pattern" may include the number or percentage of premium characters, the part of speech (such as noun, plural noun, verb, adjective, etc., possibly considering if the domain is a one word domain), the relationship of vowels and consonants (possibly considering if the domain is a 4-5 character word) (Step 730). Evaluation of Pay-Per-Click, or PPC, may include the maximum number of pay-per-click bids from various advertising tracking services of software, and the number of ads returned within search engine searches (Step 740). A dynamic multiplier based on registration statistics for each top level domain (TLD), as well as other evaluation elements described in detail below, may then be applied to the domain appraisal and/or valuation. This may be used to give a very accurate measure of domain scarcity to let a user or evaluator know how rare a domain name is.

Precision, the first of the 5 P's evaluated, may include one or more precision-determining elements. These precision-determining elements may include the following: the number of distinct keywords found in the domain name, whether the keywords are found in the dictionary, possibly including the number of keywords found, the length of the domain name and whether numerals are found in the domain name, possibly including the number of numerals found. These precision-determining elements may be stored in data storage 230 and assigned values used to determine the domain name's appraisal value and/or valuation.

A precision-determining algorithm may be established, stored and/or contained within one or more software modules, possibly one or more precision-determining software modules. Such algorithms and software modules may be stored and executed within an environment in a data center 240/250 using a server 210, client 220 and/or data storage 230, any or all of which may be communicatively coupled to a network 200.

This precision-determining algorithm, which may be substantially similar to that demonstrated in the non-limiting example embodiment(s) below and throughout this disclosure, may assign values to the precision-determining elements and/or may use these and/or other previously-stored precision-determining elements to determine the precision of the domain name, which in turn may be used to determine the appraisal value and/or valuation of the domain name.

The one or more software modules, possibly one or more precision-determining software modules containing the precision-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more precision-determining software modules, software modules within a local database or spreadsheet, or any combination thereof may be used to calculate and execute the precision-determining algorithm.

As a non-limiting example, a spreadsheet may determine the Precision of the domain name by using any combination of software modules described above to store, calculate and/or execute the following precision-determining algorithm:

=(IF(AND(words=1,dictionary=1),500,0)+IF
(words=2,0,0)+IF(words=3,−100,0)+IF
(words=4,−500,0)+IF(words>4,−1000,0)+IF(dictionary=1,100,−100)+IF(length<3,500,0)+IF
(length=3,400,0)+IF(length=4,100,0)+IF
(length=5,25,0)+IF(AND(length>5,length<11),0,
0)+IF(AND(length>10,length<16),−50,0)+IF
(length>15,−100,0)+IF(numbers=1,−70,0))

In this non-limiting example, the spreadsheet may have columns, and/or data storage 230 may have a data field for each of the precision-determining elements, and may have an additional column and/or data field to store the calculated Precision of the domain name. In other embodiments, each of the precision-determining elements, as well as the calculated Precision of the domain name may be calculated and/or stored in data fields in data storage 230. The precision-determining elements may include, but are not limited to, "words," "dictionary," "length" and "numbers."

The column and/or data field for "words" may calculate and/or store the number of words and/or keywords in the domain name. As non-limiting examples, america.us, jackaroo.com, urir.com, flippity.com, planets.com, witchcraft.com, masks.org, fuel.net, whatever.com, guns.com, compassion.org, antalya.com, joust.com and islam.net may all be one-word domain names, and thus would have a number 1 calculated and/or stored in the "words" column of the spreadsheet and/or data field of data storage 230.

Two-word domain names, having a number 2 calculated and/or stored in the "words" column and/or data field may include, as non-limiting examples, 12steps.com, finnishfelines.com, iowacars.com, pokerpinnacle.com, smokelover.com, any-cell.com, safelysent.com, sweetrings.com, goldminers.com, glob alwarming.com, tagcloud.com, fungamez.com and tourbus.com.

Three-word domain names, having a number 3 calculated and/or stored in the "words" column and/or data field may include, as non-limiting examples, figureitout.com, onlinelampguide.com, yourfavoriteplace.com, aroundtheworld.com and realestateads.com.

The column and/or data field for "dictionary" may calculate and/or store a determination of whether the domain name and/or any keywords in the domain name (without the TLD or "top level domain" such as .com, .us, .net, .org etc.) are a word or words found in the dictionary. This determination can be calculated and/or stored as a TRUE/FALSE value, or possibly numerically as a 1 or 0.

As non-limiting examples planets.com, guns.com, whatever.com and witchcraft.com may all be found in the dictionary, and thus would have a number 1 or a value of TRUE calculated and/or stored in the "dictionary" column of the spreadsheet and/or data field of data storage 230, while urir.com, flippity.com, pokerpinacle.com and fungamez.com would have a number 0 or a value of FALSE calculated and/or stored in the "dictionary" column of the spreadsheet or data field of data storage 230.

The column and/or data field for "length" may calculate (possibly using a=LEN([appropriate field]) calculation in a database) and/or store the length of, or number of letters in, the domain name and/or any keywords in the domain name (without the TLD or "top level domain" such as .com, .us, .net, .org etc.). In other words, "length" may determine and store how many characters are in the word and/or any keywords within the domain name. As a non-limiting example, planets.com would have a length of 7 letters, and thus would have a number 7 calculated and/or stored in the "length" column of the spreadsheet and/or data field of data storage 230. Likewise, guns.com would have a length of 4 letters, and thus would have a number 4 calculated and/or stored in the "length" column of the spreadsheet or data field of data storage 230.

The column and/or data field for "numbers" may calculate and/or store a determination of whether the domain name and/or keywords in the domain name contain numbers. In other words, "numbers" may determine if the domain contains numerals. This determination can be calculated and/or stored as a TRUE/FALSE value, or possibly numerically as a 1 or 0. As non-limiting examples 12steps.com contains numerals, and thus would have a number 1 or a value of TRUE calculated and/or stored in the "numbers" column of the spreadsheet and/or data field of data storage 230, while the other domain names listed above would have a number 0 or a value of FALSE calculated and/or stored in the "numbers" column of the spreadsheet and/or data field of data storage 230.

After the precision-determining elements are calculated and/or stored, the precision-determining algorithm may then evaluate and use any combination of the precision-determining elements or other disclosed elements to calculate and/or store the Precision of the domain name. The value assigned to a particular precision-determining element may increase or decrease the value of the Precision of the domain name, and in turn may increase or decrease the appraisal and/or valuation of the domain name itself.

In a non-limiting example embodiment, this process may be initiated by evaluating, by the precision-determining algorithm, the values assigned to the "words" and "dictionary" precision-determining elements and assigning an initial value to the Precision of the domain name. If both values are any combination of 1 and/or TRUE, indicating there is only one word in the domain name and that the domain name and/or keyword is found in the dictionary, the value of the domain name will be greater, thus the initial value of the Precision of the domain name will also be higher.

In the non-limiting example algorithm above, if the "words" and "dictionary" columns and/or data fields both have a value of 1 (or TRUE), indicating a 1-word domain name and that the 1 word is in the dictionary, the Precision of the domain name may be assigned an initial value of 500. If either of the values are not 1 (or FALSE), indicating a greater-than-one-word domain name, or that the 1 or more words are not in the dictionary, the Precision may be assigned an initial value of 0. Thus, the precision-determining algorithm may increase the initial value of the Precision of the domain name, and by extension, the appraisal and/or valuation of the domain name itself, depending on whether the "words" and "dictionary" columns and/or data fields both have a value of 1 (or TRUE, indicating a 1-word domain name and that the 1 word is in the dictionary).

The value assigned to the "words" and "dictionary" precision-determining elements may each be evaluated individually to determine the number of words in the domain name and whether the words are found in the dictionary respectively. Depending on the value assigned to these precision determining elements, the initial value assigned to the Precision of the domain name may be increased or decreased accordingly.

In the non-limiting example algorithm above, if the "words" data field has a value of 2, no change would be made to the initial value. If the value is 3, the initial value for Precision may be reduced by 100. If the value is 4, the initial value for Precision may be reduced by 500. If the value is greater than 4, the initial value for Precision may be reduced by 1000. Thus, the precision-determining algorithm may increase or decrease by degrees the Precision of the domain name, and by extension, the appraisal and/or valuation of the domain name, depending on whether the domain name has one word or more than one word respectively, single words being preferable to multiple words.

In the non-limiting example algorithm above, if the "dictionary" data field has a value of 1 (or TRUE), indicating that the domain name is found in the dictionary, the total value may be increased by 100, otherwise the total value may be decreased by 100. Thus, the precision-determining algorithm may increase or reduce the Precision of the domain name, and by extension, the appraisal and/or valuation of the domain name, depending on whether the domain name and/or keywords within the domain name are or are not words found in the dictionary respectively, words found in the dictionary being preferable.

The value assigned to the "length" precision-determining element may each be evaluated by the precision-determining algorithm to determine the length of, or number of letters in, the domain name and/or any keywords in the domain name (without the TLD or "top level domain" such as .com, .us, .net, .org etc.). In the non-limiting example algorithm above, if the "length" data field has a value of less than 3, the total value for Precision may be increased by 500. If the value is 3, the total value for Precision may be increased by 400. If the value is 4, the total value for Precision may be increased by 100. If the value is 5, the total value for Precision may be increased by 25. If the value is between 5 and 10, the total value for Precision may be neither increased nor reduced. If the value is between 11 and 15, the total value for Precision may be reduced by 50. If the value is greater than 15, the total value for Precision may be reduced by 100. Thus, the precision-determining algorithm may increase or reduce by degrees the Precision of the domain name, and by extension, the appraisal and/or valuation of the domain name, depending on the length of, or number of letters in, the domain name, lower length being preferable to high length.

The value assigned to the "numbers" precision-determining element may each be evaluated by the precision-determining algorithm to determine whether the domain name and/or keywords in the domain name contain numerals. In the non-limiting example algorithm above, if the "numbers" data field has a value of 1 (or TRUE), indicating that the domain name and/or keywords contain a numeral, the total value may be decreased by 70, otherwise the total value may be neither increased nor reduced. Thus, the precision-determining algorithm may increase or reduce the Precision of the domain name, and by extension, the appraisal and/or valuation of the domain name, depending on whether the domain name and/or keywords within the domain name contains numerals, numerals being less preferable.

Popularity, the second of the 5 P's evaluated, may include one or more popularity-determining elements. These popularity-determining elements may include various search result metrics measured by a search engine such as GOOGLE, and/or estimated searches per month as measured by a search engine optimization monitoring service and/or software such as WORDTRACKER. These popularity-determining elements may be stored in data storage 230 and assigned values used to determine the domain name's appraisal value and/or valuation.

A popularity-determining algorithm may be established, stored and/or contained within one or more software modules, possibly one or more popularity-determining software modules. Such algorithms and software modules may be stored and executed within an environment in a data center 240/250 using a server 210, client 220 and/or data storage 230, any or all of which may be communicatively coupled to a network 200.

This popularity-determining algorithm, which may be substantially similar to that demonstrated in the non-limiting example embodiment(s) below and throughout this disclosure, may assign values to the popularity-determining elements and/or may use these and/or other previously-stored popularity-determining elements to determine the popularity of the domain name, which in turn may be used to determine the appraisal value and/or valuation of the domain name.

The one or more software modules, possibly one or more popularity-determining software modules containing the popularity-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more popularity-determining software modules, software modules within a local database or spreadsheet, or any combination thereof may be used to calculate and execute the popularity-determining algorithm.

As a non-limiting example, a spreadsheet may determine the Popularity of the domain name by using any combination of software modules described above to store, calculate and execute the following popularity-determining algorithm:

$$=(((GP*0.05)+(GA*0.05)+(GT*0.2))/3000)+(WT*20)$$

In this non-limiting example, the spreadsheet may have columns, and/or data storage 230 may have a data field for each of the popularity-determining elements, and may have an additional column and/or data field to store the calculated Popularity of the domain name. In other embodiments, each of the popularity-determining elements, as well as the calculated Precision of the domain name may be calculated and/or stored in data fields in data storage 230.

The popularity-determining elements may include, but are not limited to, three possible metrics for various search results from a search engine such as GOOGLE. These elements are represented by GP, GA and GT respectively in the non-limiting example popularity-determining algorithm above. The precision-determining elements may also include, but are not limited to a metric for estimated searches per month as measured by a search engine optimization monitoring service and/or software such as WORDTRACKER.

The value assigned to the three popularity-determining elements related to search result metrics measured by a search engine may each be evaluated to determine the Popularity related to these metrics. In the non-limiting example algorithm above, these popularity-determining elements related to search result metrics measured by a search engine may be multiplied by a multiplier (the first and second elements by 0.05, and the third by 0.2), and the result of these calculations may then be summed together and divided by 3000.

The popularity-determining elements related to estimated searches per month as measured by a search engine optimization monitoring service and/or software may be multiplied by a multiplier (in this example 20), and the result of these calculations may then be summed together with the previous calculation related to search result metrics measured by a search engine. Thus, the popularity-determining algorithm may increase or reduce by degrees the Popularity of the domain name, and by extension, the appraisal and/or valuation of the domain name, depending on the results of the search result metrics measured by a search engine and a search engine optimization monitoring service and/or software.

After the popularity-determining elements are calculated and/or stored, the popularity-determining algorithm may then evaluate and use any combination of the popularity-determining elements or other disclosed elements to calculate and/or store the Popularity of the domain name. The value assigned to a particular popularity-determining element may increase or decrease the value of the Popularity of the domain name, and in turn may increase or decrease the appraisal and/or valuation of the domain name itself.

Presence, the third of the 5 P's evaluated, may include one or more presence-determining elements. These presence-determining elements may include the following: the age of the domain name and a ranking for the domain name using a domain ranking service such as ALEXA. These presence-determining elements may be stored in data storage 230 and assigned values used to determine the domain name's appraisal value and/or valuation.

A presence-determining algorithm may be established, stored and/or contained within one or more software modules, possibly one or more presence-determining software modules. Such algorithms and software modules may be stored and executed within an environment in a data center 240/250 using a server 210, client 220 and/or data storage 230, any or all of which may be communicatively coupled to a network 200.

This presence-determining algorithm, which may be substantially similar to that demonstrated in the non-limiting example embodiment(s) below and throughout this disclosure, may assign values to the presence-determining elements and/or may use these and/or other previously-stored presence-determining elements to determine the presence of the domain name, which in turn may be used to determine the appraisal value and/or valuation of the domain name.

The one or more software modules, possibly one or more presence-determining software modules containing the presence-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more presence-determining software modules, software modules within a local database or spreadsheet, or any combination thereof may be used to calculate and execute the presence-determining algorithm.

As a non-limiting example, a spreadsheet may determine the Presence of the domain name by using any combination of software modules described above to store, calculate and execute the following presence-determining algorithm:

```
=(IF(Age<1,-50,0)+IF(AND(Age>0,Age<3),-25,0)+
    IF(AND(Age>2,Age<5),0,0)+IF(AND(Age>4,
    Age<8),200,0)+IF(Age>7,500,0)+IF(Alexa=0,
    0)+IF(AND(Alexa>0,Alexa<100000),7500,0)+IF
    (AND(Alexa>100000,Alexa<300000),4000,0)+
    IF(AND(Alexa>300000,Alexa<500000),2000,
    0)+IF(AND(Alexa>500000,Alexa<1000000),
    1000,0)+IF(AND(Alexa>1000000,
    Alexa<2000000),700,0)+IF(AND
    (Alexa>2000000,Alexa<3000000),500,0)+IF
    (AND(Alexa>3000000,Alexa<4000000),200,0)+
    IF(AND(Alexa>4000000,Alexa<5000000),100,
    0)+IF(Alexa>5000000,25,0))
```

In this non-limiting example, the spreadsheet may have columns, and/or data storage 230 may have a data field for each of the presence-determining elements, and may have an additional column and/or data field to store the calculated Presence of the domain name. In other embodiments, each of the presence-determining elements, as well as the calculated Presence of the domain name may be calculated and/or stored in data fields in data storage 230.

The presence-determining elements may include, but are not limited to, "Age" and "Alexa" The column and/or data field for "Age" may calculate and/or store the age of the domain name. No limitations should be placed on the time-intervals for the "Age." For example, Age could be measured in days, weeks, months, years, etc. As a non-limiting example, the age in the example algorithm above may measure the age of the domain name in years, so a 4-year-old domain name would have a number 4 calculated and/or stored in the "Age" column of the spreadsheet or data field of data storage 230.

The column and/or data field for "Alexa" may calculate and/or store the ranking for the domain name using a domain-name ranking service such as ALEXA. As a non-limiting example, a domain name with an ALEXA rank of 2,162,313 would have that number calculated and/or stored in the "Alexa" column of the spreadsheet or data field of data storage 230.

After the presence-determining elements are calculated and/or stored, the presence-determining algorithm may then evaluate and use any combination of the presence-determining elements or other disclosed elements to calculate and/or store the Presence of the domain name. The value assigned to a particular presence-determining element may increase or decrease the value of the Presence of the domain name, and in turn may increase or decrease the appraisal and/or valuation of the domain name itself.

The value assigned to the "Age" presence-determining element may each be evaluated to determine the age of the domain name. In the non-limiting example algorithm above, if the "Age" data field has a value of less than 3, the total value for Presence may be reduced by 25. If the value is between 3 and 4, the total value for Presence may be neither increased nor decreased. If the value is between 5 and 7, the total value for Presence may be increased by 200. If the value is greater than 7, the total value for Precision may be increased by 500. Thus, the presence-determining algorithm may increase or reduce by degrees the Presence of the domain name, and by extension, the appraisal and/or valuation of the domain name, depending on the age of the domain name, higher age being preferable to lower age.

The value assigned to the "Alexa" presence-determining element may each be evaluated to determine the rank of the domain name according to a domain-name ranking service such as ALEXA. In the non-limiting example algorithm above, if the "Alexa" data field has a value of between 0 and 100000, the total value for Presence may be increased by 7500. If the "Alexa" data field has a value of between 100000 and 300000, the total value for Presence may be increased by 4000. If the "Alexa" data field has a value of between 300000 and 500000, the total value for Presence may be increased by 2000. If the "Alexa" data field has a value of between 500000 and 1000000, the total value for Presence may be increased by 1000. If the "Alexa" data field has a value of between 1000000 and 2000000, the total value for Presence may be increased by 700. If the "Alexa" data field has a value of between 2000000 and 3000000, the total value for Presence may be increased by 500. If the "Alexa" data field has a value of between 3000000 and 4000000, the total value for Presence may be increased by 200. If the "Alexa" data field has a value of between 4000000 and 5000000, the total value for Presence may be increased by 100. If the "Alexa" data field has a value greater than 5000000, the total value for Presence may be increased by 25. Thus, the presence-determining algorithm may increase the Presence of the domain name, and by extension, the appraisal and/or valuation of the domain name, depending on the ranking of the domain name.

Pattern, the fourth of the 5 P's evaluated, may include one or more pattern-determining elements. These pattern-determining elements may include the following: the number of premium characters found in the domain name, the part of speech found in the domain name (possibly evaluating if the part of speech is only one word) and the vowel-consonant relationship of the domain name (possibly evaluating whether the domain name is limited to 4 or 5 characters). These pattern-determining elements may be stored in data storage 230 and assigned values used to determine the domain name's appraisal value and/or valuation.

A pattern-determining algorithm may be established, stored and/or contained within one or more software modules, possibly one or more pattern-determining software modules. Such algorithms and software modules may be stored and executed within an environment in a data center 240/250 using a server 210, client 220 and/or data storage 230, any or all of which may be communicatively coupled to a network 200.

This pattern-determining algorithm, which may be substantially similar to that demonstrated in the non-limiting example embodiment(s) below and throughout this disclosure, may assign values to the pattern-determining elements and/or may use these and/or other previously-stored pattern-determining elements to determine the pattern of the domain name, which in turn may be used to determine the appraisal value and/or valuation of the domain name.

The one or more software modules, possibly one or more pattern-determining software modules containing the pattern-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more pattern-determining software modules, software modules within a local database or spreadsheet, or any combination thereof may be used to calculate and execute the pattern-determining algorithm.

As a non-limiting example, a spreadsheet may determine the Pattern of the domain name by using any combination of software modules described above to store, calculate and execute the following pattern-determining algorithm:

=IF(*VCVCV*=1,10,0)+IF(*CVCVC*=1,15,0)+IF
(*CVCV*=1,20,0)+IF(*VCVC*=1,18,0)+IF
(*VCCV*=1,10,0)+IF(*CVVC*=1,10,0)+IF
(prem100=1,15,0)+IF(prem75=1,10,0)+IF
(prem50=1,0,0)+IF(prem0=1,−15,0)+IF
(Noun=1,1500,0)+IF(PluralNoun=1,2000,0)

In this non-limiting example, the spreadsheet may have columns, and/or data storage 230 may have a data field for each of the pattern-determining elements, and may have an additional column and/or data field to store the calculated Pattern of the domain name. In other embodiments, each of the pattern-determining elements, as well as the calculated Pattern of the domain name may be calculated and/or stored in data fields in data storage 230. The pattern-determining elements may include, but are not limited to, "VCVCV" (indicating a pattern of vowel, consonant, vowel, consonant, vowel), "CVCVC" (indicating a pattern of consonant, vowel, consonant, vowel, consonant), "CVCV" (indicating a pattern of consonant, vowel, consonant, vowel), "VCVC" (indicating a pattern of vowel, consonant, vowel, consonant), "VCCV" (indicating a pattern of vowel, consonant, consonant, vowel), "CVVC" (indicating a pattern of consonant, vowel, vowel, consonant), "100% Prem," "75-99% Prem," "50-75% Prem," "0-50% Prem," "Noun," "Plural Noun," "Verb," "Adjective," etc.

The column and/or data fields for the vowel and consonant pattern-determining elements (including VCVCV, CVCVC, CVCV, VCVC, VCCV and CVVC in the non-limiting example elements above) may calculate and/or store a determination of whether the domain name and/or keywords in the domain name contain a corresponding pattern of vowels and consonants. This determination can be calculated and/or stored as a TRUE/FALSE value, or possibly numerically as a 1 or 0. In other non-limiting embodiments, the actual pattern of vowels and consonants may be calculated and/or stored in the data fields.

As non-limiting examples urir.com may be found to have the vowel and consonant pattern of VCVC, and thus would have a number 1 or a value of TRUE calculated and/or stored in the "VCVC" column of the spreadsheet and/or data field of data storage 230, while fuel.net would have a number 1 or a value of TRUE calculated and/or stored in the "CVVC" column of the spreadsheet or data field of data storage 230.

The column and/or data fields for the premium characters pattern-determining elements (including prem100, prem75, prem50 and prem0 in the non-limiting example elements above) may calculate and/or store a determination of whether the domain name and/or keywords in the domain name contain a corresponding pattern of premium characters. This determination can be calculated and/or stored as a TRUE/FALSE value, or possibly numerically as a 1 or 0. In other non-limiting embodiments, the actual pattern of premium characters may be calculated and/or stored in the data fields.

As non-limiting examples planets.com may be found to have 100% of the premium characters (corresponding to prem100), and thus would have a number 1 or a value of TRUE calculated and/or stored in the "100% Prem" column of the spreadsheet and/or data field of data storage 230. Witchcraft.com, whatever.com and guns.com may be found to have between 75% and 99% of the premium characters (corresponding to prem75), and thus would have a number 1 or a value of TRUE calculated and/or stored in the "75-99% Prem" column of the spreadsheet or data field of data storage 230. 12steps.com may be found to have between 50% and 75% of the premium characters (corresponding to prem50), and thus would have a number 1 or a value of TRUE calculated and/or stored in the "50-75% Prem" column of the spreadsheet or data field of data storage 230. A similar logic may be applied for prem0 and the "0-50% Prem" column of the spreadsheet or data field of data storage 230.

The column and/or data fields for the part of speech pattern-determining elements (including Noun, PluralNoun, etc. in the non-limiting example elements above) may calculate and/or store a determination of whether the domain name and/or keywords in the domain name contain a corresponding pattern of the part of speech found. This determination can be calculated and/or stored as a TRUE/FALSE value, or possibly numerically as a 1 or 0. In other non-limiting embodiments, the actual part of speech may be calculated and/or stored in the data fields.

As non-limiting examples witchcraft.com may each be found to be a Noun, and thus would have a number 1 or a value of TRUE calculated and/or stored in the "Noun" column of the spreadsheet and/or data field of data storage 230. Planets.com and guns.com may each be found to be a Plural Noun, and thus would have a number 1 or a value of TRUE calculated and/or stored in the "Plural Noun" column of the spreadsheet or data field of data storage 230.

After the pattern-determining elements are calculated and/or stored, the pattern-determining algorithm may then evaluate and use any combination of the pattern-determining elements or other disclosed elements to calculate and/or store the Pattern of the domain name. The value assigned to a particular pattern-determining element may increase or decrease the value of the Pattern of the domain name, and in turn may increase or decrease the appraisal and/or valuation of the domain name itself.

The value assigned to the vowel and consonant pattern-determining elements (including VCVCV, CVCVC, CVCV, VCVC, VCCV and CVVC in the non-limiting example elements above) may each be evaluated to determine whether the domain name and/or keywords in the domain name contain the corresponding pattern of vowels and consonants.

In the non-limiting example algorithm above, if the corresponding vowel and consonant data field has a value of 1 (or TRUE), indicating that the domain name and/or keywords contain that particular pattern of vowels and consonants, the total value may be increased (by 10, 15, 20, 18, 10 or 10 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain the corresponding vowel and consonant pattern-determining elements, with certain patterns being preferable.

The value assigned to the percentage of premium characters pattern-determining elements (including prem100, prem75, prem50 and prem0 in the non-limiting example elements above) may each be evaluated to determine whether the domain name and/or keywords in the domain name contain the corresponding percentage of premium characters within the pattern.

In the non-limiting example algorithm above, if the corresponding percentage of premium characters data field has a value of 1 (or TRUE), indicating that the domain name and/or keywords contain that particular percentage of premium characters, the total value may be increased or reduced by degrees (by 15, 10, 0 or −15 respectively, in this example), otherwise the total value may be neither increased nor reduced. Thus, the pattern-determining algorithm may increase or reduce the Pattern of the domain name, and by extension, the appraisal and/or valuation of the domain name, depending on whether the domain name and/or keywords within the domain name contain a corresponding percentage of premium characters pattern-determining elements, with higher percentages of premium characters being preferable.

The value assigned to the part of speech pattern-determining elements (including Noun, PluralNoun, etc. in the non-limiting example elements above) may each be evaluated to determine whether the domain name and/or keywords in the domain name contain the corresponding part of speech within the pattern.

In the non-limiting example algorithm above, if the corresponding part of speech data field has a value of 1 (or TRUE), indicating that the domain name and/or keywords contain that particular part of speech, the total value may be increased (by 1500 or 2000 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain corresponding part of speech pattern-determining elements, with recognized parts of speech being preferable.

Pay-per-click or PPC, the fifth of the 5 P's evaluated, may include one or more PPC-determining elements. These PPC-determining elements may include various pay-per-click bid metrics measured by a service and/or software such as ADWORDS and/or the number of ads returned as measured by a search engine such as GOOGLE. These PPC-determining elements may be stored in data storage 230 and assigned values used to determine the domain name's appraisal value and/or valuation.

A PPC-determining algorithm may be established, stored and/or contained within one or more software modules, possibly one or more PPC-determining software modules. Such algorithms and software modules may be stored and executed within an environment in a data center 240/250 using a server 210, client 220 and/or data storage 230, any or all of which may be communicatively coupled to a network 200.

This PPC-determining algorithm, which may be substantially similar to that demonstrated in the non-limiting example embodiment(s) below and throughout this disclosure, may assign values to the PPC-determining elements and/or may use these and/or other previously-stored PPC-determining elements to determine the PPC of the domain name, which in turn may be used to determine the appraisal value and/or valuation of the domain name.

The one or more software modules, possibly one or more PPC-determining software modules containing the PPC-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more PPC-determining software modules, software modules within a local database or spreadsheet, or any combination thereof may be used to calculate and execute the PPC-determining algorithm.

As a non-limiting example, a spreadsheet may determine the PPC of the domain name by using any combination of software modules described above to store, calculate and execute the following PPC-determining algorithm:

$$=(PPCBid*100)+(Ads*50)$$

In this non-limiting example, the spreadsheet may have columns, and/or data storage 230 may have a data field for each of the PPC-determining elements, and may have an additional column and/or data field to store the calculated PPC of the domain name. In other embodiments, each of the PPC-determining elements, as well as the calculated PPC of the domain name may be calculated and/or stored in data fields in data storage 230.

The PPC-determining elements may include, but are not limited to, metrics for various pay-per-click bid metrics measured by a service and/or software such as ADWORDS, and/or The PPC-determining elements may also include, but are not limited to a metric for the number of ads returned as measured by a search engine such as GOOGLE.

The value assigned to the various pay-per-click bid metrics measured by a service may each be evaluated to determine the PPC related to these metrics. In the non-limiting example algorithm above, these PPC-determining elements related to various pay-per-click bid metrics may be multiplied by a multiplier (in this example 100).

The PPC-determining elements related to the number of ads returned as measured by a search engine may also be multiplied by a multiplier (in this example 50), and the result of this calculation may then be summed together with the previous calculation related to various pay-per-click bid metrics measured by a service and/or software. Thus, the PPC-determining algorithm may increase or reduce the PPC of the domain name, and by extension, the appraisal and/or valuation of the domain name, depending on the results of the various pay-per-click bid metrics measured by a service and/or the number of ads returned as measured by a search engine.

After the PPC-determining elements are calculated and/or stored, the PPC-determining algorithm may then evaluate and use any combination of the PPC-determining elements or other disclosed elements to calculate and/or store the PPC of the domain name. The value assigned to a particular PPC-determining element may increase or decrease the value of the PPC of the domain name, and in turn may increase or decrease the appraisal and/or valuation of the domain name itself.

Valuation, determined by the elements below, as well as the 5 P's evaluated and their respective elements, may also include one or more valuation-determining elements. These valuation-determining elements, possibly used in conjunction with the 5 P's evaluated, as well as each of the respective elements used to determine them, may include the following: The domain name separate from the TLD, the TLD associated with the domain name, the availability of the domain name with a .com TLD, a multiplier for the domain name's TLD, a determination of whether or not the domain name contains dashes, as well as the number of dashes, if any, found in the domain name and a multiplier adjusted for domain names containing dashes. These valuation-determining elements may be stored in data storage 230 and assigned values used to determine the domain name's appraisal value and/or valuation.

A valuation-determining algorithm may be established, stored and/or contained within one or more software modules, possibly one or more valuation-determining software modules. Such algorithms and software modules may be stored and executed within an environment in a data center 240/250 using a server 210, client 220 and/or data storage 230, any or all of which may be communicatively coupled to a network 200.

This valuation-determining algorithm, which may be substantially similar to that demonstrated in the non-limiting example embodiment(s) below and throughout this disclosure, may assign values to the valuation-determining elements and/or may use these and/or other previously-stored valuation-determining elements to determine the valuation of the domain name, which in turn may be used to determine the appraisal value of the domain name.

The one or more software modules, possibly one or more valuation-determining software modules containing the valuation-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more valuation-determining software modules, software modules within a local database or spreadsheet, or any combination thereof may be used to calculate and execute the valuation-determining algorithm.

As a non-limiting example, a spreadsheet may determine the Valuation of the domain name by using any combination of software modules described above to store, calculate and execute the following valuation-determining algorithm:

=IF(IF(AND(Popularity<15,com_available=1),0,SUM
(Precision:*PPC*)*(IF(AND(words=1,*WT*>250),
25,IF(*WT*>250,15,6))*tld_multiplier*
dash_multiplier))<10,0,IF(AND(Popularity<15,
com_available=1),0,SUM(Precision:PPC)*(IF
(AND(words=1,*WT*>250),25,IF(*WT*>
250,15,6))*tld_multiplier*dash_multiplier)))

In this non-limiting example, the spreadsheet may have columns, and/or data storage 230 may have a data field for each of the valuation-determining elements, and may have an additional column and/or data field to store the calculated Valuation of the domain name. In other embodiments, each of the valuation-determining elements, as well as the calculated Valuation of the domain name may be calculated and/or stored in data fields in data storage 230. The valuation-determining elements may include, but are not limited to, "Domain," "TLD," "com_available," "tld_multiplier," "dashes" and "dash_multiplier."

The column and/or data field for "Domain" may calculate and/or store a determination of the domain name without its associated TLD. As non-limiting examples planets.com, guns.com, whatever.com and witchcraft.com would have "planets," "guns," "whatever" and "witchcraft" calculated and/or stored in the "Domain" column of the spreadsheet and/or data field of data storage 230 respectively.

The column and/or data field for "TLD" may calculate and/or store a determination of the top level domain associated with the domain name. As non-limiting examples planets.com, guns.com, whatever.com and witchcraft.com would all have "com" calculated and/or stored in the "TLD" column of the spreadsheet and/or data field of data storage 230 respectively.

The column and/or data field for "com_available" may calculate and/or store a determination of whether the .com TLD for a particular domain name is available. This determination can be calculated and/or stored as a TRUE/FALSE value, or possibly numerically as a 1 or 0. As non-limiting examples onlinelampguide.com and finnishfelines.com may both be domain names available with a .com TLD, and thus would have a number 1 or a value of TRUE calculated and/or stored in the "com_available" column of the spreadsheet and/or data field of data storage 230, while the other domain names listed above would have a number 0 or a value of FALSE calculated and/or stored in the "com_available" column of the spreadsheet and/or data field of data storage 230.

The column and/or data field for "tld_multiplier" may calculate and/or store a multiplier based on the TLD associated with the domain name. In one non-limiting example embodiment, this multiplier will always be less than 1 for TLDs other than .com. A non-limiting example formula or algorithm may be used to determine the multiplier as follows:

=IF(tld="com",1,IF(tld="org",0.08,IF(tld="net",0.1,
IF(tld="*ca*",0.12,IF(tld="us",0.015)))))

Thus, if the TLD stored in the TLD column and/or data field is "com", then a value of 1 may be calculated and/or stored in the "tld_multiplier" column of the spreadsheet and/or data field of data storage 230. If the TLD stored in the TLD column is "org", then a value of 0.08 may be calculated and/or stored in the "tld_multiplier" column of the spreadsheet and/or data field of data storage 230. If the TLD stored in the TLD column is "net", then a value of 0.1 may be calculated and/or stored in the "tld_multiplier" column of the spreadsheet and/or data field of data storage 230. If the TLD stored in the TLD column is "ca", then a value of 0.12 may be calculated and/or stored in the "tld_multiplier" column of the spreadsheet and/or data field of data storage 230. If the TLD stored in the TLD column is "us", then a value of 0.15 may be calculated and/or stored in the "tld_multiplier" column of the spreadsheet and/or data field of data storage 230.

As non-limiting examples masks.org would have a value of 0.08 calculated and/or stored in the "tld_multiplier" column of the spreadsheet and/or data field of data storage 230, fuel.net would have a value of 0.1 calculated and/or stored in the "tld_multiplier" column of the spreadsheet and/or data field of data storage 230, america.us would have a value of 0.015 calculated and/or stored in the "tld_multiplier" column of the spreadsheet and/or data field of data storage 230, while the other domain names listed above would have a value of 1 calculated and/or stored in the "tld_multiplier" column of the spreadsheet and/or data field of data storage 230.

No limitations should be placed on how the multiplier for a particular domain name is determined. As a non-limiting example, to come up with the value of that same domain name for other TLDs, a multiplier may be based on comparable sales or sometimes simply intuition. In one non-limiting example embodiment, a dynamic multiplier may be created based on registration statistics per each TLD. This embodiment may give a very accurate measure of domain scarcity, thus indicating for domain name appraisal purposes relatively how rare a domain is. When doing this domain evaluation the standard may be to evaluate a name for the .com TLD and then apply a multiplier (always less than 1) to come up with the value of that same name in other TLDs. In another embodiment, the .com top level domain may be used as a baseline multiplier and each additional top level domain may be assigned a multiplier less than the baseline multiplier, but proportional to the number of registrations for that top level domain name in comparison to .com domains.

As non-limiting examples, using the embodiment using the registration statistics per each TLD, the registrations may use registration data to determine the following example registration statistics: COM—80,451,101, NET—12,227,350, ORG—7,541,738, INFO—5,134,461, BIZ—2,014,553, US—1,557,592, MOBI—836,345. Using these statistics, the following multipliers may be determined by comparing the proportional registrations of other TLDs to .com TLD registrations: com=1, net=0.15, org=0.09, info=0.06, biz=0.02, us=0.01, mobi=0.009. It should be noted that the dynamic top level domain multiplier in this example is based on registration statistics for each of a plurality of top level domains, .com top level domains being assigned a multiplier of 1 and each additional top level domain being assigned a multiplier of less than 1 proportional to the number of registrations for that top level domain name as compared to the .com domains.

Thus, using the example multipliers based on registration statistics, the following example appraisals may be made (possibly using a software module executed on a server and configured to create and apply a top level domain multiplier comprising registration statistics) based on the multiplier for the domain "play": play.com=$100,000, play.net=$15,000, play.org=$9,000, play.info=$6,000, play.biz=$2,000, play.us=$1,000, play.mobi=$900. These figures may be calculated by applying the top level domain multiplier to the certified domain name appraisal process by multiplying the dynamic top level domain multiplier by the appraisal and/or valuation of the domain name.

The column and/or data field for "dashes" may calculate and/or store a determination of whether the domain name and/or any keywords in the domain name contain dashes. This determination can be calculated and/or stored as a TRUE/FALSE value, or possibly numerically as a 1 or 0. As non-limiting examples any-cell.com contains dashes, and thus would have a number 1 or a value of TRUE calculated and/or stored in the "dashes" column of the spreadsheet and/or data field of data storage 230, while the other domain names listed above would have a number 0 or a value of FALSE calculated and/or stored in the "dashes" column of the spreadsheet and/or data field of data storage 230.

The column and/or data field for "dash_multiplier" may calculate and/or store a multiplier based on whether the domain name contains dashes, as determined by the "dashes" column and/or data field. A non-limiting example formula or algorithm may be used to determine the multiplier as follows:

=IF(dashes=0,1,IF(dashes=(words−1),0.1,0.01))

Thus, if the value stored in the dashes column and/or data field is 0 (or FALSE), then a value of 1 may be calculated and/or stored in the "dash_multiplier" column of the spreadsheet and/or data field of data storage 230. If the total of 1 minus the value in the "words" column and/or data field (previously disclosed) is the same as the value stored in the "dashes" column or data field, then a value of 0.1 may be calculated and/or stored in the "dash_multiplier" column of the spreadsheet and/or data field of data storage 230, otherwise, a value of 0.01 may be calculated and/or stored in the "dash_multiplier" column of the spreadsheet and/or data field of data storage 230.

As non-limiting examples any-cell.com would have a value of 0.1 calculated and/or stored in the "dash_multiplier" column of the spreadsheet and/or data field of data storage 230, while the other domain names listed above would have a value of 1 calculated and/or stored in the "dash_multiplier" column of the spreadsheet and/or data field of data storage 230.

After the valuation-determining elements are calculated and/or stored, the valuation-determining algorithm may then evaluate and use any combination of the valuation-determining elements or other disclosed elements to calculate and/or store the Valuation of the domain name. The value assigned to a particular valuation-determining element may increase or decrease the value of the Valuation of the domain name, and in turn may increase or decrease the appraisal of the domain name itself.

=IF(IF(AND(Popularity<15,com_available=1),0,SUM
(Precision:$PPC$)*(IF(AND(words=1,$WT$>250),
25,IF($WT$>250,15,6))*tld_multiplier*
dash_multiplier))<10,0,IF(AND(Popularity<15,
com_available=1),0,SUM(Precision:$PPC$)*(IF
(AND(words=1,$WT$>250),25,IF($WT$>
250,15,6))*tld_multiplier*dash_multiplier)))

To fully understand this example algorithm, it is important to break the algorithm into smaller component parts. A smaller example algorithm is being evaluated to determine if it is less than or greater than 10. If the result of this smaller example algorithm is less than 10, the value of the Valuation is 0, otherwise the value of the Valuation is the result of the smaller example algorithm. The smaller algorithm is as follows:

IF(AND(Popularity<15,com_available=1),0,SUM
(Precision:$PPC$)*(IF(AND(words=1,$WT$>250),
25,IF($WT$>250,15,6))*tld_multiplier*
dash_multiplier))

The value assigned to the "Popularity" valuation-determining element (itself calculated using the popularity-determining elements) may be evaluated by the valuation-determining algorithm to determine the value assigned to the popularity of the domain name. The value assigned to the "com_available" valuation-determining element may also be evaluated by the valuation-determining algorithm to determine whether the .com TLD for a particular domain name is available. In the non-limiting example algorithm above, if the "Popularity" data field has a value of less than 15, and the com_available data field has a value of 1 (or TRUE), the total value of the smaller example algorithm may be assigned a value of 0, which would in turn cause the Valuation of the domain name to be 0, since the result of the smaller example algorithm is less than 10. Thus, the valuation-determining algorithm may increase or reduce the Valuation of the domain name, and by extension, the appraisal of the domain name, depending on whether the Popularity valuation-determining element is greater than 15 and whether the .com TLD for the domain name is available, Popularity greater than 15 and non-available .com domain names being preferable.

If the Popularity of the domain name is greater than 15 and/or the .com TLD for the domain name is not available, the total value of the smaller example algorithm may be determined by multiplying 4 multiplicands. Again, it is helpful to break this smaller example algorithm into smaller component parts to better understand it. In the smaller example algorithm, the first multiplicand is the sum of the Precision and the PPC valuation-determining elements.

The second multiplicand is determined by evaluating the following formula/algorithm: IF(AND(words=1,WT>250), 25,IF(WT>250,15,6) In this formula/algorithm, the value assigned to the words valuation-determining element may be evaluated to determine whether the value is 1. The value assigned to the metric for estimated searches per month (WT in the example algorithm) may also be evaluated to determine if the value is greater than 250. If the words element value is 1 and the estimated searches per month value is greater than 250, then the value assigned to the second multiplicand would be 25, otherwise, the value assigned to the second multiplicand would be determined by again evaluating the value assigned to the metric for the estimated searches per month (WT in this example).

If this value is greater than 250, the value assigned to the second multiplicand would be 15; otherwise the value assigned to the second multiplicand would be 6. The third and fourth multiplicands are the values of the valuation-determining elements calculated and/or stored in the tld_multiplier and dash_multiplier columns and/or data fields respectively.

As non-limiting examples and using the algorithms described in detail above, planets.com may be found to have a Precision, Popularity, Presence, Pattern and PPC of 600, 22877, 1000, 2015 and 241 respectively. Using the formulas above, planets.com would have a Valuation of $668,320.00.

FIG. 8 shows an example interface using the disclosed structure that may be used for displaying the progress of the domain spinning to allow the domain names to be displayed to the user. Likewise, FIG. 8 shows the appraisal and/or valuation of the domain name which may be displayed to a user on a user interface on a client.

The additional steps included in the embodiments illustrated in FIG. 1-8 are not limited to the embodiment shown in FIG. 1, FIG. 7, or their respective illustrated embodiments, and may be combined in several different orders and modified within multiple other disclosed embodiments. Likewise, the method steps disclosed herein may be accomplished by a software module executed on a server and/or client configured to accomplish that method step.

A Method and System for Word Splitting

Several different methods may be used to provide and manage the disclosed invention. In an example embodiment illustrated in FIG. 9, a user may enter a string of characters into a user interface as a word splitting input on a client computer 220, possibly seeking more information about a domain name, a spell check database, a search engine suggestion algorithm or any other use for word splitting (Step 900). The interface may also present the user with the option to choose the number of results to be displayed to the user on the interface on the client from the entered character string (Step 900). Any combination of software modules used together with hardware on a server computer 210 in a data center 240/250, as seen in FIG. 2 and described in detail herein, may receive and analyze the submitted word splitting input, possibly supplemented with additional information from data storage 230 within the data center 240/250.

One or more software modules may use this analysis to create a cached micro-dictionary comprising a plurality of micro-dictionary words from the character string (Step 910). This cached micro-dictionary may be used both to store words derived from the character string as well as compare words within the character string, keyword list, etc. with existing words in the cached micro-dictionary. The count of micro-dictionary words within the cached micro-dictionary may be used to establish a loop count, where the loop count is used to begin each pass through a micro-dictionary loop with a different micro-dictionary word as the first to be used (Step 910).

This cached micro-dictionary and character string may be passed into an algorithm calculated within one or more software modules executed on a communicatively-coupled server computer 210 and/or client computer 220. This algorithm may be used to find the largest contiguous word (Step 920) from the string. For each pass through the micro-dictionary loop, a determination may be made as to whether characters still remain in the character string. If so, the steps described in detail below for finding the largest contiguous word, including passing in the character string and the loop count, may be repeated until no characters remain. When it is determined that no characters remain, another iteration of the loop count may begin, where, when the micro-dictionary loop loops back for a new loop count, the new pass begins with a different micro-dictionary word as the first to be used (Step 910).

For each iteration prior to determining whether characters remain, a three step process may be observed: the largest contiguous word may be found, as detailed herein, the largest contiguous word may be removed from the character string and the largest contiguous word may be added to and stored in a keyword list with the beginning character position (Step 920).

Duplicate words may be removed, a plurality of reliability scores for a plurality of keyword strings from the keyword list may be calculated and the keywords may be reordered by character position (Step 930). Keyword strings and reliability scores may then be returned to the user via an interface on the client computer 220 and the keyword strings and reliability scores may be calculated, returned and displayed to the user on the client interface, possibly based on reliability factors, discussed in detail below (Step 940).

The software modules used in the context of the current invention may be stored in the memory of—and run on—at least one server 210 or client 220. As a non-limiting example of such software modules, one or more word splitting software modules may be used to split the character string into a plurality of keywords and determine, according to information stored in data storage 230 such as a dictionary database, whether words from the dictionary database are found within the character sting (or smaller contiguous strings when finding the largest contiguous word to create keyword strings) for possible purposes of seeking more information about a domain name, a spell check database, a search engine suggestion algorithm or any other use for word splitting.

One or more reliability score software modules may likewise be used to calculate a reliability score for each of one or more word splits derived from the word splitting input and/or character string, etc. The software modules may comprise software and/or scripts containing instructions that, when executed by a microprocessor on a server computer 210 or client computer 220, cause the microprocessor to accomplish the purpose of the module or the methods disclosed herein, in this example to create one or more splits in a character string input as a word splitting input or calculate a reliability score for each of one or more word splits derived from the word splitting input and/or display this information to the user on an interface on the client computer 220.

Figure 10:
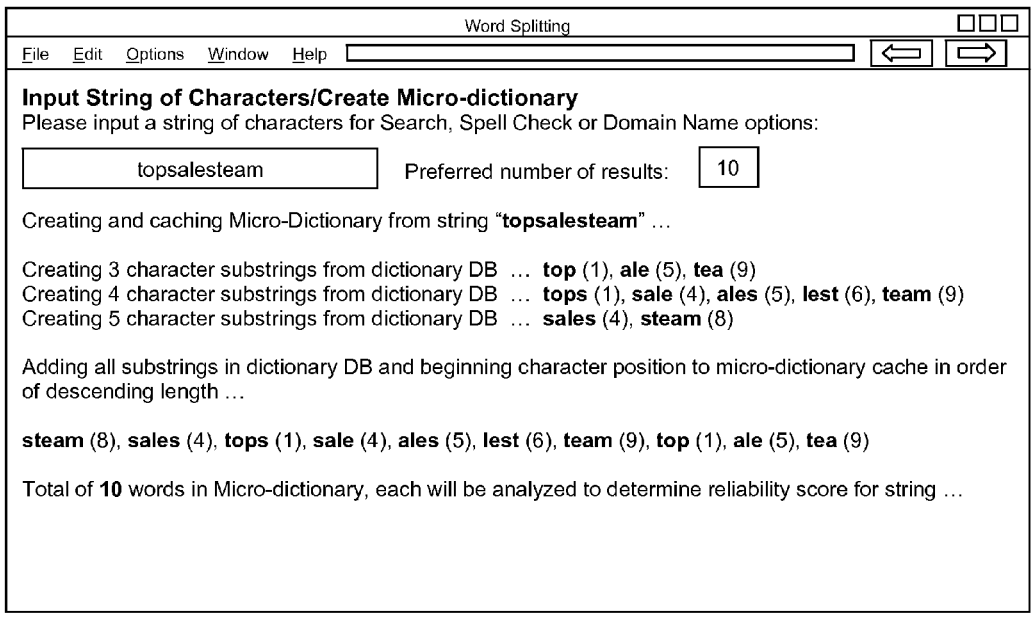
FIG. 10 illustrates a possible embodiment of an interface for inputting a character string and creating a micro-dictionary.

FIG. 10 shows an example interface using the disclosed structure that may be used for receiving one or more character strings and optionally the number of results to be displayed (Step 900). In this non-limiting example the user has entered the character string "topsalesteam." The user in this example has also elected to receive 10 results from this string, if available.

Figure 9:
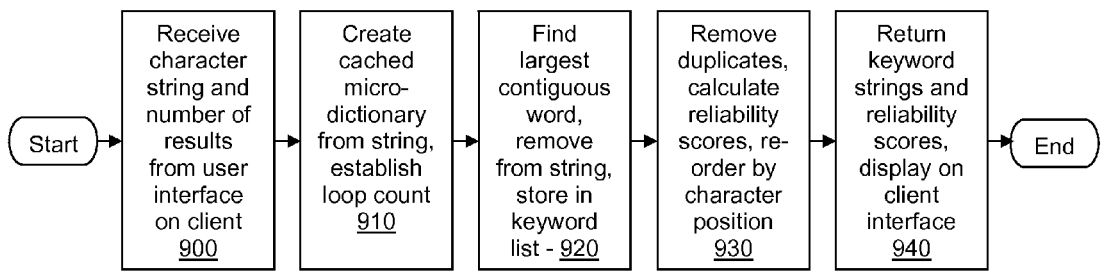
FIG. 9 is a flow diagram illustrating a possible embodiment of a method for word splitting.
Figure 11:
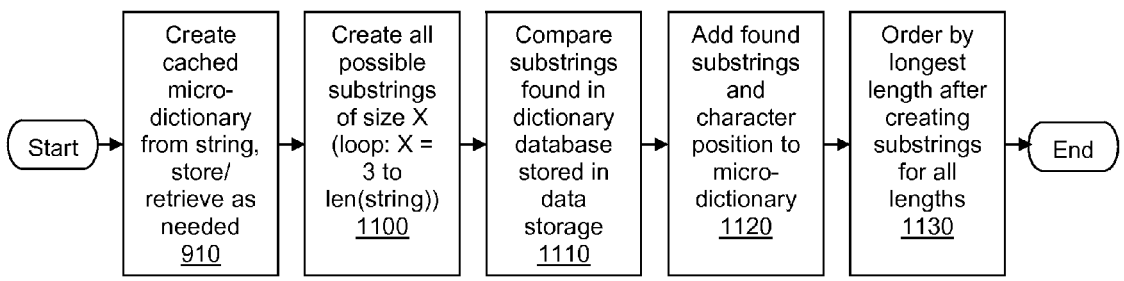
FIG. 11 is a flow diagram illustrating a possible embodiment of a method for word splitting.

FIG. 11 shows that the embodiment illustrated in FIG. 9, as well as other disclosed embodiments, may include the step of creating all possible substrings of size X from the character string where X is part of a loop with X=3 on the first iteration and incrementing by 1 on each iteration of the loop until X=len(string) or the total length of the character string (Step 1100). In other words, a variable may be established for a substring length, wherein an assigned value for the variable begins at 3.

One or more software modules may be used to generate all possible variations of one or more substrings of the character string, where the one or more substrings equal the length of the variable X established. Each of these one or more substrings created or generated may then be compared to words found in a dictionary database, possibly stored in data storage 230 (Step 1110). Those of the one or more substrings found in the dictionary database, along with a beginning character position for each of the one or more substrings, may be added to the micro-dictionary as micro-dictionary words (Step 1120). The substrings found in the dictionary database may be sorted, ranked, ordered and/or displayed in descending order according to length, so that the substring found with the longest length is sorted, ranked, ordered and/or displayed first, the next longest substring is sorted, ranked, ordered and/or displayed next and so on (Step 1130).

For each iterations from the step of establishing the variable through adding the one or more substrings found to the micro-dictionary ordered by length of the substring, the variable may be incremented by one until the variable is equal to the length of the character string. Once the loop has completed, a determination may be made as to the number of substrings added to the micro-dictionary as micro-dictionary words. This number of micro-dictionary words stored in the cached micro-dictionary may be used to establish a loop count, used by other software modules and methods disclosed herein.

In the non-limiting example embodiment shown in FIG. 10, one or more software modules on one or more server or client computers 210/220 may begin a loop within the step of creating a micro-dictionary based on the input character string "topsalesteam" (Step 1100). The loop may begin by setting a variable for the length of the substring to 3 to be compared to a dictionary database. For each iteration through the loop, the variable, and thus the number of characters to be compared, may be incremented, continuing through 4-character substrings, 5-character substrings, etc., until it has exhausted all possibilities through the total length of the character string "topsalesteam," which is 12 characters in length.

Each of the substrings from the character string "topsalesteam" may then be compared to words and/or substrings found in a dictionary database, possibly stored in data storage 230 (Step 1110). In the non-limiting example embodiment shown in FIG. 10, the one or more software modules may compare all 3-character strings found in "topsalesteam" to the dictionary database to create and compare to a dictionary database to determine that 3-character substrings "top," "ale" and "tea" are found in the dictionary database. The one or more software modules may then increment the number of characters in the substring by one each time through the loop and repeat the process, so that the character substrings "tops," "sale," "ales," "lest" and "team" are created, compared and found in the dictionary database for 4-character substrings and "sales" and "steam" are created, compared and found in the dictionary database for 5-character substrings.

These substrings for 3, 4 and 5-character substrings may then be added, along with their respective character positions in the original character string "topsalesteam," (seen in parentheses in FIG. 10) to the micro-dictionary (Step 1120). The substrings found in the dictionary database may then be ordered according to descending length, so that the substring found with the longest length is sorted, ordered, ranked and/or displayed first, the next longest substring is sorted, ordered, ranked and/or displayed next and so on (Step 1130). In the non-limiting example embodiment seen in FIG. 10, the substring "steam" beginning at position (8) and "sales" found at position (4) are both 5 characters in length, so are listed first. 4-character substrings "tops (1)," "sale (4)," "ales (5)," "lest (6)" and "team (9)" are listed next, and 3-character substrings "top (1)," "ale (5)" and "tea (9)" are listed last.

Figure 12:
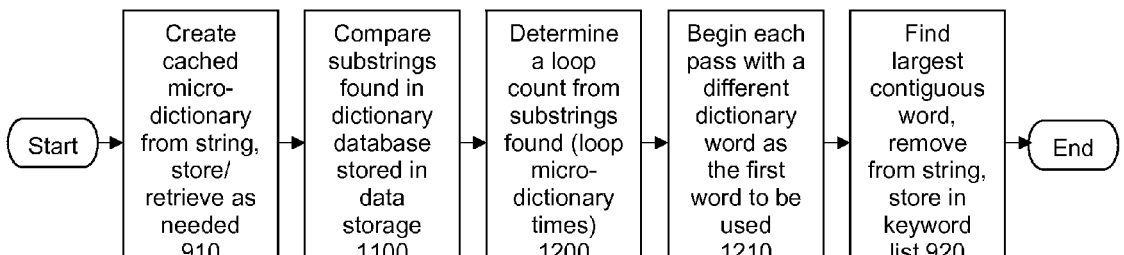
FIG. 12 is a flow diagram illustrating a possible embodiment of a method for word splitting.

FIG. 12 shows that the embodiment illustrated in FIG. 9, as well as other disclosed embodiments, may include the step of determining and establishing a loop count based on the substrings found and added to the micro-dictionary (Step 1200). The purpose of the loop count is to begin each pass with a different substring/micro-dictionary word as the first to be used, thus the loop count will be a count of substrings/micro-dictionary words found and added to the micro-dictionary (Step 1210). This loop count may be passed in, along with the character string, cached micro-dictionary words/substrings and/or positions of characters, via one or more modules on a communicatively coupled server computer 210 or computer client 220, which may then be used to find the largest contiguous word (Step 920). The non-limiting example embodiment shown in FIG. 10 shows that a total of 10 words are found in the micro-dictionary, so 10 loops will be included in the loop count to pass a different substring/dictionary word for each word in the micro-dictionary.

Figure 13:
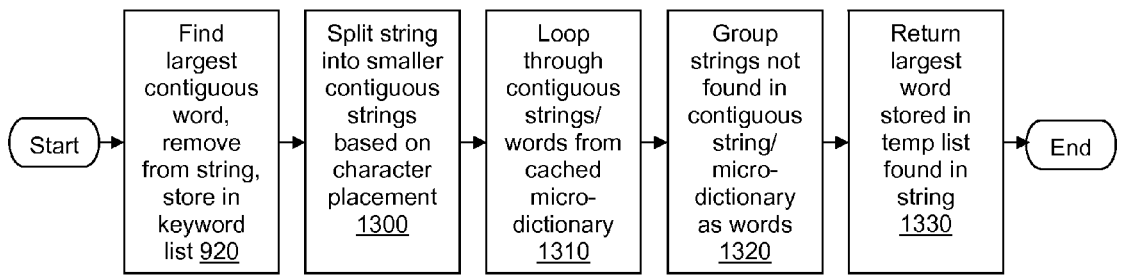
FIG. 13 is a flow diagram illustrating a possible embodiment of a method for word splitting.
Figure 14:
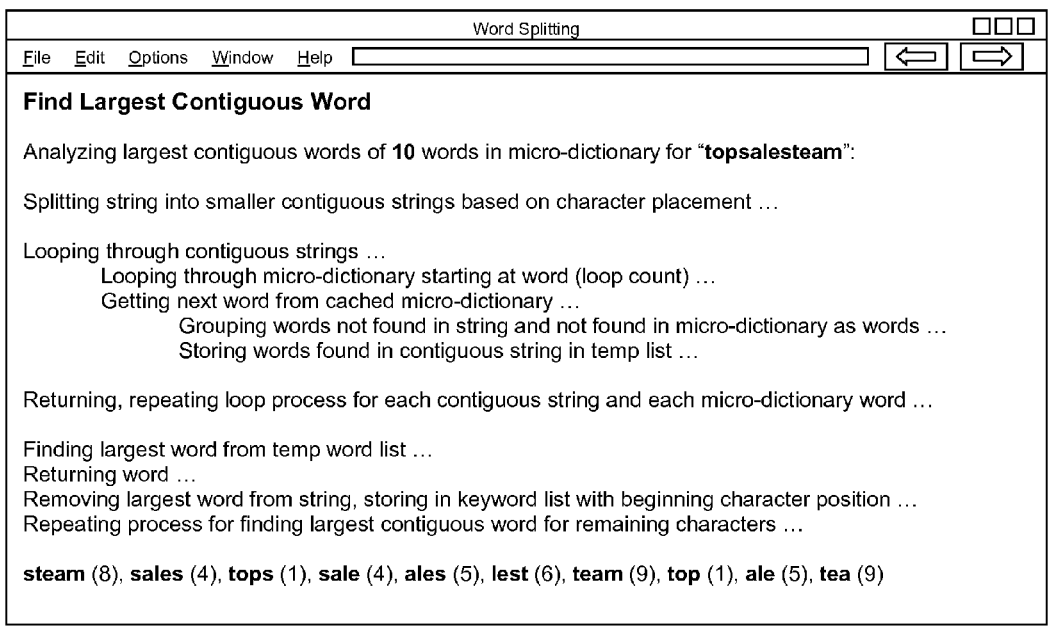
FIG. 14 illustrates a possible embodiment of an interface for finding a largest contiguous word.

FIG. 13, as well as a non-limiting example embodiment shown in FIG. 14, show that the embodiment illustrated in FIG. 9, as well as other disclosed embodiments, may include, as steps in finding the largest contiguous string (Step 920), the steps of splitting the character string into a plurality of smaller contiguous strings based on character placement (Step 1300), looping through an "outer loop" comprising each of the plurality of smaller contiguous strings and/or words from the cached micro-dictionary (Step 1310), grouping strings not found in the contiguous string and/or micro-dictionary as words (Step 1320), and returning the largest word stored in the temp list found in contiguous string (Step 1330).

FIG. 14 shows an example interface using the disclosed structure that may be used for finding the largest contiguous word (Step 920), as well as the additional steps shown in FIGS. 13-17. In this non-limiting example, 10 words have been added to the micro-dictionary based on the character string "topsalesteam." These 10 words derived from the character string may be used to establish a loop count (Step 1200), which may in turn be used to find the largest contiguous word (Step 920). As seen in FIGS. 13 and 14, the string may be split into smaller contiguous strings based on character placement (Step 1300) and the algorithm may loop through the contiguous strings.

In one embodiment seen in FIG. 14, finding the largest contiguous word (Step 920) may include the steps of passing the character string, and the loop count established from the plurality of micro-dictionary words, into an algorithm used to find the largest contiguous word (Step 920), splitting the character string into a plurality of smaller contiguous strings based on character placement (Step 1300), and creating an "outer loop" comprising a loop through each of the plurality of smaller contiguous strings (Step 1310).

In addition to the "outer loop" used by the algorithm to loop through contiguous strings, the algorithm may also loop through words from the cached micro-dictionary (Step 1500). In certain embodiments, this second "inner loop" may also be established, comprising a loop through each of the plurality of micro-dictionary words for each "outer loop" through each of the plurality of smaller contiguous strings (Step 1310).

Figure 15:
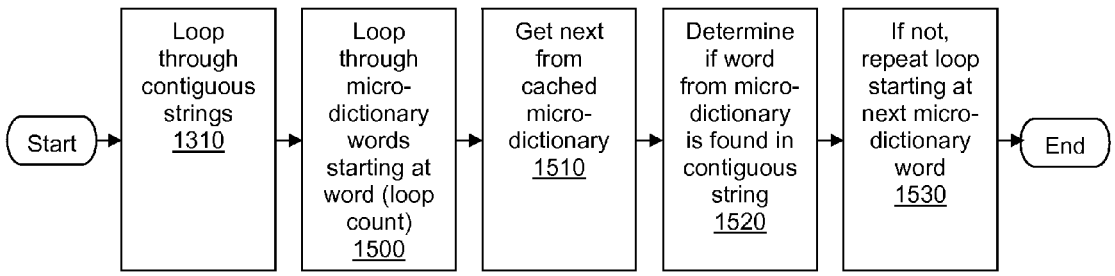
FIG. 15 is a flow diagram illustrating a possible embodiment of a method for word splitting.

FIG. 15 shows that the embodiment illustrated in FIGS. 13 and 14, as well as other disclosed embodiments, may include the steps of looping through this "inner loop" of the micro-dictionary words starting at the word found at the loop count at the current iteration of the loop (Step 1500), getting each of the next words from the cached micro-dictionary at each subsequent iteration of the loop (Step 1510) and determining if the word from the micro-dictionary is found in the contiguous string in the current iteration of the outer loop (Step 1520). If the word from the micro-dictionary is not found in the contiguous string (Step 1520), the loop may be repeated starting at the next micro-dictionary word.

Put another way, this "inner loop" may further include the steps of looping through each of the plurality of micro-dictionary words, in order of and encompassing each word in the loop count (Step 1500), and, for each of the plurality of micro-dictionary words in the inner loop (Step 1510), determining if the micro-dictionary word is found in each of the plurality of smaller contiguous strings (Step 1520).

As shown in FIG. 14, the string "topsalesteam" may be analyzed and split into smaller contiguous strings based on character placement (Step 1300). A loop through each of the contiguous strings from "topsalesteam" may be established, and for each of these contiguous strings, each word in the micro-dictionary may be compared with each of the contiguous strings to determine if the word is found in the current contiguous string (Steps 1500-1530). In addition, a determination may be made that the contiguous string is not found in the micro-dictionary, the string may be grouped as a word and the string grouped as a word may be stored in a temp list. The outer loop through the contiguous strings may then be continued.

Figure 16:
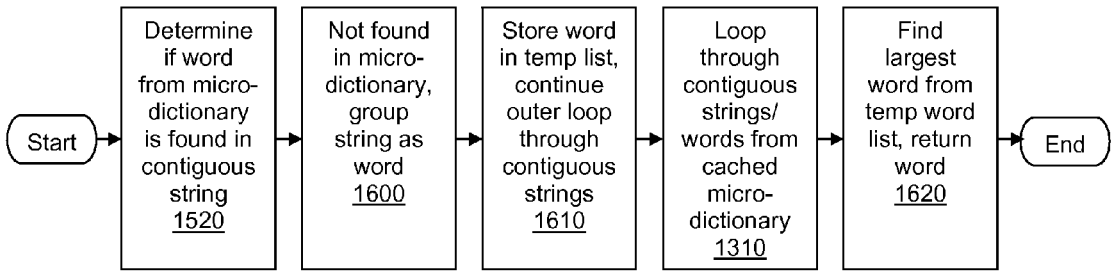
FIG. 16 is a flow diagram illustrating a possible embodiment of a method for word splitting.

Specifically, FIGS. 14 and 16 show that the embodiment illustrated in FIGS. 13-15, as well as other disclosed embodiments, may include the steps of, if the word in the current inner loop iteration of the micro-dictionary is not found in the contiguous string of the current loop iteration of the outer loop (Step 1520), a determination may be made that the word is not found in the micro-dictionary, and the string may be grouped as a word (Step 1600). This word may then be stored in a temporary list, and the outer loop through the list of contiguous strings may continue (Step 1610, 1310). Ultimately the largest word from the temp list may be found and returned (Step 1620).

Put another way, if one of the plurality of the micro-dictionary words is not found in one of the smaller contiguous strings (Step 1600), a determination may be made that the smaller contiguous string is not found in the micro-dictionary (Step 1610), the loop count may be incremented by one, and a determination may be made if the micro-dictionary word next in the micro-dictionary is found in the one of the plurality of smaller contiguous strings (Step 1310).

Figure 17:
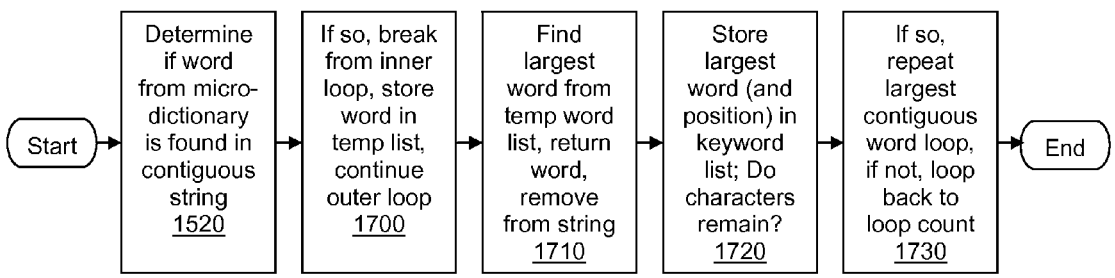
FIG. 17 is a flow diagram illustrating a possible embodiment of a method for word splitting.

FIGS. 14 and 17 show that the embodiments illustrated in FIGS. 13-16, as well as other disclosed embodiments, may include the steps of, if the current word from the inner loop through the micro-dictionary is found in the current contiguous string from the outer loop through the contiguous strings (Step 1520), breaking from the inner loop through the micro-dictionary words, storing the word in a temp list and continuing the outer loop through the contiguous strings (Step 1700). This largest word from the temp word list, prior to being removed, may be stored, along with the its position in the string, in a keyword list, and a determination may be made as to whether characters remain in the string (Step 1720).

Put another way, for each of one or more contiguous strings not found in the micro-dictionary, the one or more smaller contiguous strings not found in the micro-dictionary may be grouped as words, where the plurality of smaller contiguous strings may be grouped as one or more temporary words, and may be stored in the temporary list while the outer loop may be continued (Step 1700).

The largest word from the temporary word list may be found, returned and removed from the string; In other words, finding the largest of the one or more temporary words and returning the largest of the one or more temporary words found from the temporary word list to be stored in the keyword list with its beginning character position (Step 1710-1720).

If characters remain (Step 1720), the steps to find the largest contiguous word, represented by FIGS. 13-17 may be repeated for each iteration of the words used to determine the loop count (Step 1730). If characters remain in the current iteration of the micro-dictionary loop, finding a next largest contiguous word. Put another way, if additional characters remain (Step 1720), the process may be repeated, beginning with finding the largest contiguous word (passing in the current loop count) and removing the largest word from the string and storing in the keyword list (Step 1700-1720). This process may be repeated until no characters remain.

If characters do not remain (Step 1720), the process loops back to the next count in the loop count, and repeats finding the largest contiguous word (passing in the loop count), removes the largest word from the string with beginning character position and stores the word in the keyword list (Step 1730). Put another way, if characters remain in the current iteration of the micro-dictionary loop, finding a next largest contiguous word, and if no characters remain in the current iteration of the micro-dictionary loop, incrementing the loop count and continuing the micro-dictionary loop with a next dictionary word in the loop count as the first to be used (Step 1720-1730).

Figure 18:
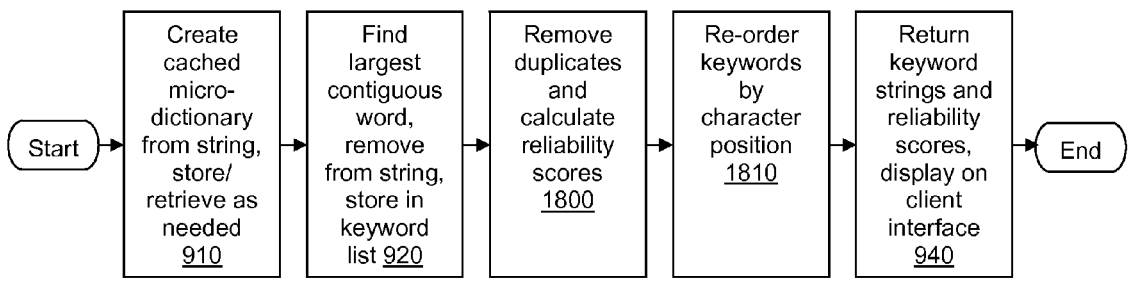
FIG. 18 is a flow diagram illustrating a possible embodiment of a method for word splitting.
Figure 19:
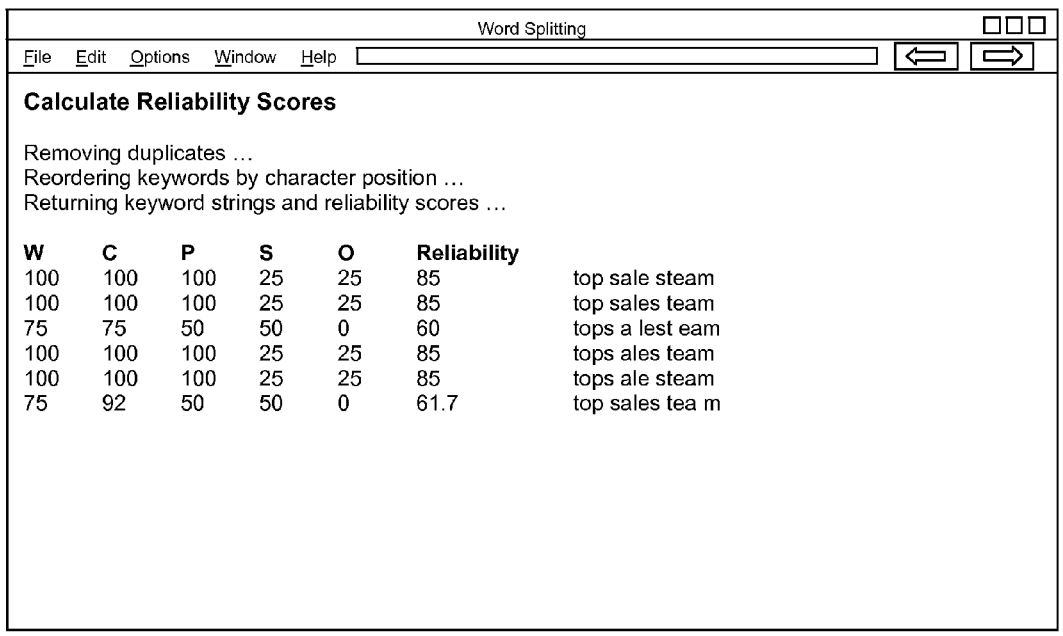
FIG. 19 illustrates a possible embodiment of an interface for calculating and displaying reliability scores.

Once the process has run through the number of times for the loop count, duplicate words may be removed, and reliability scores may be calculated. FIGS. 18 and 19 show that the embodiment illustrated in FIG. 9, as well as other disclosed embodiments, may include the steps of removing duplicates and calculating reliability scores (Step 1800). Keywords may then be re-ordered by character position (Step 1810). Put another way, on completing the micro-dictionary loop, one or more duplicate words may be removed from the keyword list, and the plurality of keyword strings may be re-ordered by character position (Step 1800-1810).

A Method and System for Calculating a Reliability Score

Calculating the reliability score may include consideration of variables (represented below as W, C, P, S and O reliability variables) within an algorithm executed by the appropriate software modules. The reliability score may be determined by manipulating these variables in a preset reliability formula. Any combination of software modules used together with hardware on a client computer 220 or server computer 230 in a data center 240/250, as illustrated in FIG. 2, and described in detail herein, may receive and analyze the submitted information, possibly a word splitting character string input, from a user interface on a client computer 220, possibly supplemented by additional information from data storage 230 within one or more data centers 240/250. The software modules, possibly including one or more word splitting software modules, may use this analysis to create an automated reliability score of the character string used as a domain name, spell check, search engine etc. possibly using a reliability score algorithm, the reliability score algorithm possibly contained within one or more reliability score software modules.

Figure 20:
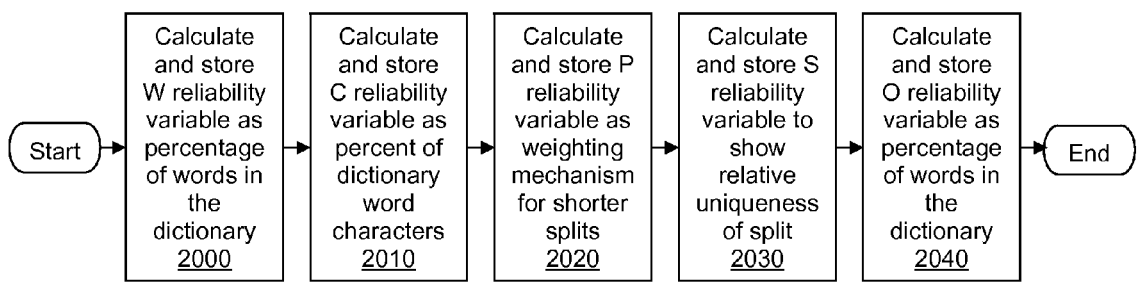
FIG. 20 is a flow diagram illustrating a possible embodiment of a method for calculating and displaying reliability scores.

The reliability score may be calculated and determined, as seen in FIGS. 19 and 20, by dividing the character string into one or more word splits, and calculating a reliability score for each of the one or more words splits derived from the word splitting input character string. The reliability score may be divided into and evaluated by four or five logical groupings, including evaluation of the W, C, S, P and O reliability variables related to the received character string, described in detail below.

The first reliability variable, or "W" reliability variable, may compare a plurality of keywords derived from each of the one or more word splits with a plurality of dictionary words in a dictionary database to determine a percentage of the plurality of keywords found in the dictionary database (Step 2000). In other words, determination of the W reliability variable may include evaluating the percentage of words found in the dictionary database. An algorithm to determine the W reliability variable may be established, stored and/or contained within one or more software modules. Such algorithms and software modules may be stored and executed within an environment in a data center 240/250 using any combination of a server 210, client 220 and data storage 230, any or all of which may be communicatively coupled to a network 200. The result of the calculations for the W reliability variable may be stored in data storage 230.

The next reliability variable or "C" reliability variable may include the percentage of characters in the dictionary words (Step 2010). In other words, for each of the one or more word splits, a percentage of characters in the plurality of keywords found in the dictionary database may be evaluated and determined. An algorithm to determine the C reliability variable may be established, stored and/or contained within one or more software modules in a similar manner to the W reliability variable as described herein.

In a non-limiting example to demonstrate evaluation and determination of the W and C reliability variables, a user may enter the character string "meandmykid." The input character string may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 67 | 70 | 100 | 100 | 0 | 70.5 | mean dmy kid |
| 100 | 100 | 50 | 100 | 100 | 90 | me and my kid |

In this non-limiting example, the words "mean" and "kid" were found in the dictionary database. However, "dmy," although grouped as a word, was not found in the dictionary database. Since only two words were recognized within the first word split as found in the dictionary database, only ⅔, or 67%, of the words were found in the dictionary database, and the "W" reliability variable is set at 67. Likewise, of the 10 letters in "meandmykid," only 7 total letters were found in words which were found in the dictionary database. Since 70% of the characters in the original string were found in words found in the dictionary database, and the "C" reliability variable is set at 70.

The "P" reliability variable may rank each of the one or more word splits based on how many of the plurality of keywords were derived from each of the one or more word splits (for example, 3 keywords may be a better split than 4). The P reliability variable may be used to counter-act the S score (described below) as a weighting mechanism geared towards shorter splits (Step 2020). An algorithm to determine the P reliability variable may be established, stored and/or contained within one or more software modules in a similar manner to the W reliability variable as described herein.

The rank for each of the one or more word splits may be higher according to fewer splits within each of the one or more word splits. Ranking each of the one or more word splits may further comprise generating a number for each of the one or more word splits representing a count of the number of keywords for each of the one or more word splits. Ranking each of the one or more word splits may further comprise using the number of keywords for each of the one or more word splits as a rank, where the lowest number of keywords is determined to be the highest rank. Determination of the P reliability variable may include the inverse of the rank of the number of keywords. A rank may then be determined by calculating a percentage derived from the inverse of the rank assigned to the number of keywords. The percentage may then be converted into a whole number to determine a final ranking score.

In a non-limiting example, a user may enter the character string "expertsexchange." The input character string may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 100 | 100 | 100 | 100 | 33 | 93.3 | experts exchange |
| 100 | 100 | 50 | 50 | 33 | 78.3 | experts ex change |
| 100 | 100 | 50 | 50 | 33 | 78.3 | expert sex change |
| 75 | 93 | 33 | 50 | 0 | 58.4 | experts ex chang e |
| 75 | 93 | 33 | 50 | 0 | 58.4 | ex pert s exchange |

In this non-limiting example, a determination of how many keywords each split has may be made, and that number may then be ranked. This non-limiting example may better demonstrate the P variable, as there are three different possibilities for number of keywords, compared to two possibilities for keywords found in "topsalesteam:"

experts exchange: 2 keywords
experts ex change: 3 keywords
expert sex change: 3 keywords
experts ex chang e: 4 keywords
ex pert s exchange: 4 keywords This example shows that there are three different counts of keywords (2, 3, 4) amongst all of the splits, so we rank each one:

2 keywords=rank 1
3 keywords=rank 2
4 keywords=rank 3

The definition above states that the P reliability variable may include the inverse of the rank of the number of keywords or in other words, the P score is 1/rank so it this example may be evaluated as follows:

experts exchange: 1/1 (100%)
experts ex change: 1/2 (50%)
expert sex change: 1/2 (50%)
experts ex chang e: 1/3 (33%)
ex pert s exchange: 1/3 (33%)

So if the algorithm starts with assumption that shorter splits are more advantageous, then for each potential split, a number may be created representing the count of keywords for that split (2 for experts exchange, 3 for experts ex change, etc.). Using the number of keywords for each split as a rank, a rank may be established according to lowest number of keywords as highest/first rank (2 keywords=rank 1, 3 keywords=rank 2, etc.). The inverse of the rank may be used to determine a percentage, and the percentage may be represented as a whole number, which will be displayed as the final score.

The "S" variable may score a uniqueness of each of the one or more word splits (Step 2030). The S reliability variable may determine relative uniqueness of the split based on how many other splits contain the same number of words. An algorithm to determine the S reliability variable may be established, stored and/or contained within one or more software modules in a similar manner to the W reliability variable as described herein.

The uniqueness each of the one or more word splits may be higher if the one or more word splits has fewer splits. The uniqueness of each of the one or more word splits may determined by how many of the one or more word splits contain the same number of keywords. The uniqueness of each of the one or more word splits may be scored by calculating a percentage derived from the inverse of the number of the one or more word splits that produces that number of keywords. The percentage may be converted into a whole number to determine a final score.

In a non-limiting example, the input character string "topsalesteam" may be evaluated according to the methods disclosed herein and displayed on a user interface similar to that seen in FIG. 19. Using the methods disclosed above, the following reliability scores may be returned:

| W | C | P | S | O | Reliability | |
|---|---|---|---|---|---|---|
| 100 | 100 | 100 | 25 | 25 | 85 | top sale ssteam |
| 100 | 100 | 100 | 25 | 25 | 85 | top sales team |
| 75 | 75 | 50 | 50 | 0 | 60 | tops a lest eam |
| 100 | 100 | 100 | 25 | 25 | 85 | tops ales team |
| 100 | 100 | 100 | 25 | 25 | 85 | tops ale steam |
| 75 | 92 | 50 | 50 | 0 | 61.7 | top sales tea m |

In the topsalesteam example, there may be 6 potential splits; 4 of these splits may be three keywords long while the other 2 may be four keywords long. Given that knowledge, the six splits themselves may be considered and evaluated:
top sale steam: 3 keywords thus the S score is ¼ (25%) since there are four total splits that produce 3 keywords.
top sales team: 3 keywords, S=25
tops a lest eam: 4 keywords so the S score is ½ (50%) as there are only two splits that have 4 keywords making those splits a bit more unique.
tops ales team: 3 keywords, S=25
tops ale steam: 3 keywords, S=25
top sales tea m: 4 keywords, S=50

So if the algorithm starts with the assumption that the fewer splits with that number of keywords, the more unique the split, the word splitting and reliability score algorithms may determine variations in the number of potential splits from the original string (6 potential variations in splits), determine the number of splits with the same number of keywords (4 are 3 words long, 2 are 4 keywords long) and determine that the S reliability variable may include the inverse of the number of other stings with the same number of keywords. The score may then be created by taking the inverse of the number of splits that produce those number of keywords, deriving a percentage as a whole number representing the final score. The number of strings with same number of splits get same score. The final score with the higher whole number represents greater uniqueness of the split. Therefore, the lower the number of splits with that number of keywords, the more unique the split The "O" reliability variable may weight the percentage of the plurality of keywords found in the dictionary database according to whether or not the percentage of the plurality of keywords found in the dictionary database is 100 (Step 2040). Determination of the O reliability variable may include a determination of whether W=100. If so, then O=100*1/count (keywords where W=100). If W is not 100, then O=0. Other evaluation elements described in detail below, may also be applied to the domain, spell check, search engine, etc. for the reliability score. An algorithm to determine the O reliability variable may be established, stored and/or contained within one or more software modules as described above regarding the W reliability variable. The results of this formula may be seen in the example results above for the strings "meandmykid," "topsalesteam" and "expertsexchange."

In other words, if this word split had a 100 value for the W reliability factor, then the O reliability would represent the percentage of all word splits generated that also have a 100 value for the W reliability factor.

Having established the 5 reliability variables, the reliability score for these and other character strings may be calculated using the following formula, the results of which are demonstrated in the example results above for the strings "meandmykid," "topsalesteam" and "expertsexchange:"

$$\text{Reliability} = ((W*5)+(C)+(P*2)+S+O)/10$$

In other words, the reliability score for each of the one or more word splits is calculated by multiplying the percentage of the plurality of keywords found in the dictionary database with a first multiplicand, the ranking of the one or more word splits is multiplied by a second multiplicand, adding these products to the percentage of characters, the uniqueness of the one or more word splits and the rank of the one or more word splits, and dividing this sum by a divisor.

In the event that multiple splits have the same reliability score, an n-gram algorithm may be used by the one or more software modules as a sort of "tie-breaker" to determine which of the scores is in fact the most reliable. If a first plurality score for a first keyword string is the same as a second plurality score for a second keyword string, an n-gram score using an algorithm and a dataset may determine relative usage of keywords together with common language.

An n-gram may be defined as a subsequence of n items from a given sequence. In the context of the current invention, the "n" in n-gram may represent the number of words. n-gram models are used in various areas of statistical natural language processing and genetic sequence analysis. An n-gram model may be used in the context of the current invention to predict the most likely of the keyword strings with equal reliability scores to be desirable to the user. The statistical properties of n-grams may be used to determine the most desirable of the tied keyword strings.

The n-gram algorithm may be used as a secondary sort after the reliability scores are determined to determine the most reliability of a final keyword split. As a non-limiting example, because "topsalesteam" has 4 splits of 3 words each with equal reliability, each split may be passed into a 3-gram dataset with 4 different possibilities:
 1) Top sale steam 3-gram score=0
 2) top sales team 3-gram score=679
 3) tops ales team 3-gram score=0
 4) tops ale stream 3-gram score=0

In this example, the use of the n-gram algorithm shows that top sales team is the most reliable of those presented to the user on the interface on the client computer. The n-gram scores generated for this example are based on a sample n-gram where "top sales team" was the only word split found that was represented in the n-gram database.

Figure 21:
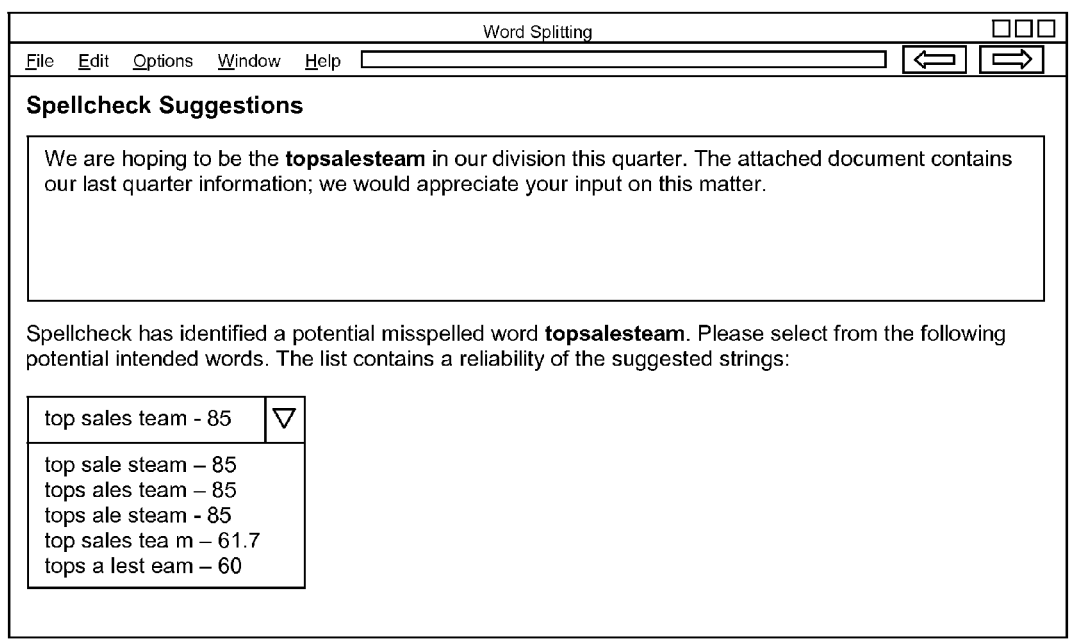
FIG. 21 illustrates a possible embodiment of an interface for calculating and displaying reliability scores in a spell check context.
Figure 22:
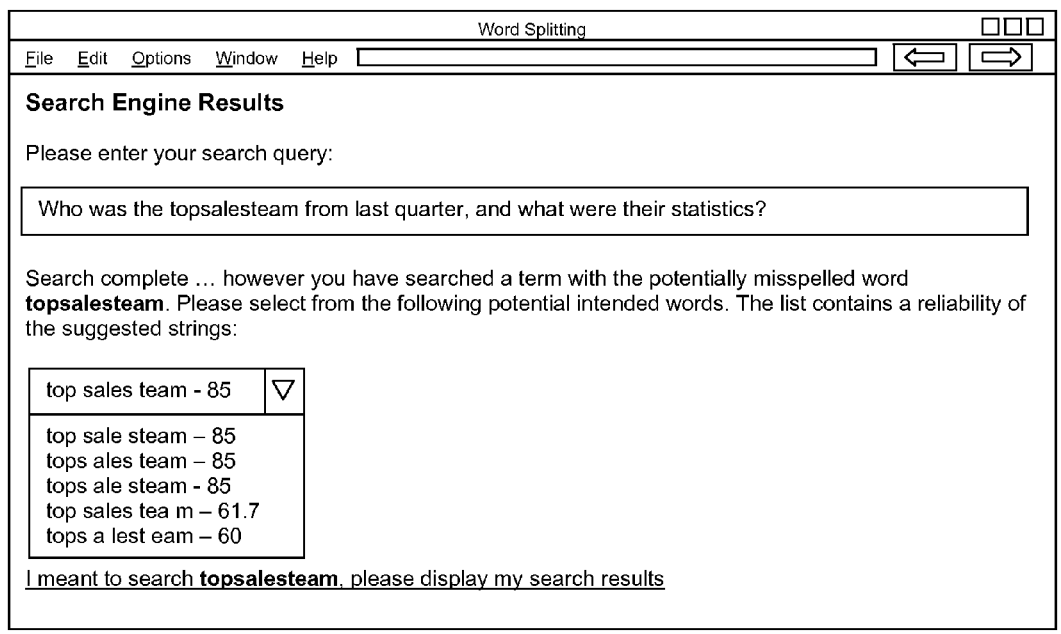
FIG. 22 illustrates a possible embodiment of an interface for calculating and displaying reliability scores in a search engine context.
Figure 23:
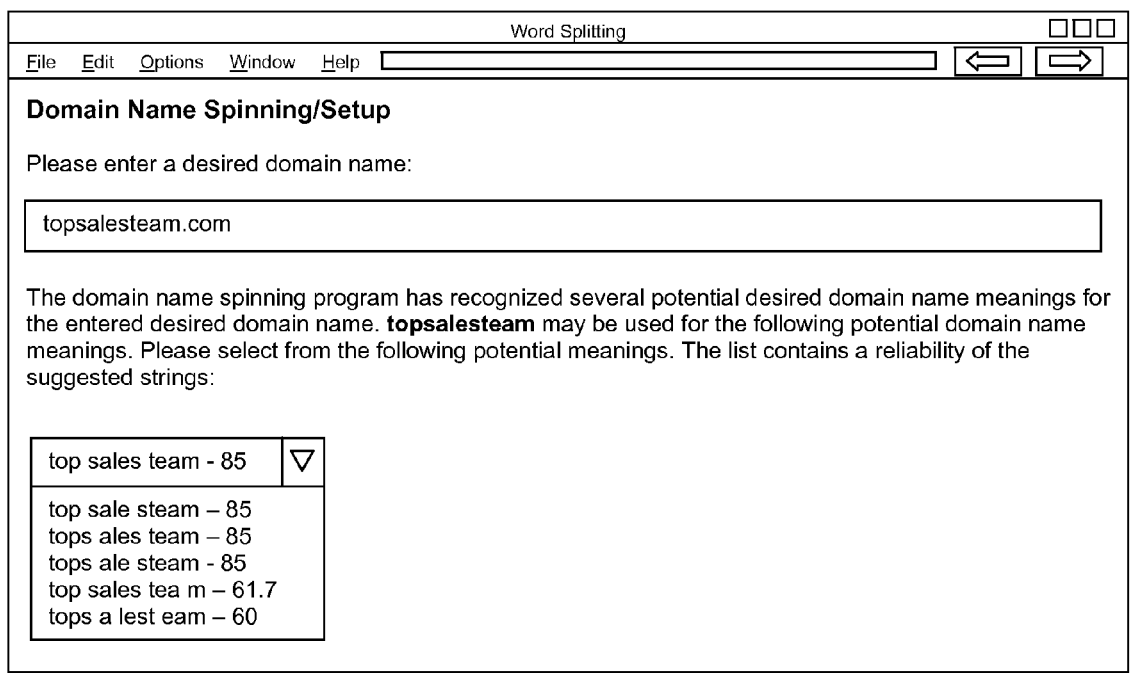
FIG. 23 illustrates a possible embodiment of an interface for calculating and displaying reliability scores in a domain spinning context.

As shown in FIGS. 21-23, the reliability score may be used in the context of a spell check program, a search engine program or a domain setup program. In the non-limiting example embodiment in FIG. 21, a spell check program may recognize a potentially misspelled word "topsalesteam." Using the word splitting and reliability score software modules described herein, the spell check program may recommend various possibilities for the potentially misspelled word, with the most likely of the tied reliability scores, according to the n-gram algorithm, displayed first.

In the non-limiting example embodiment in FIG. 22, a search engine suggestion program may recognize a potentially misspelled word "topsalesteam." Using the word splitting and reliability score software modules described herein, the search engine suggestion program may recommend various possibilities for the potentially misspelled word, with the most likely of the tied reliability scores, according to the n-gram algorithm, displayed first.

In the non-limiting example embodiment in FIG. 23, a domain spinning program may recognize a potential desired domain name "topsalesteam." Such a domain spinning program may be used in the setup of a domain. Using the word splitting and reliability score software modules described herein, the domain spinning program may recommend various possibilities for meanings for the potential domain name, with the most likely of the domain name meanings, according to the n-gram algorithm, displayed first.

The additional steps included in the embodiments illustrated in FIG. 1-8 are not limited to the embodiment shown in FIGS. 1, 7, 9, 20 or their respective illustrated embodiments, and may be combined in several different orders and modified within multiple other disclosed embodiments. Likewise, the method steps disclosed herein may be accomplished by a software module executed on a server and/or client configured to accomplish that method step.

A System for Appraising a Domain Name

Figure 24:
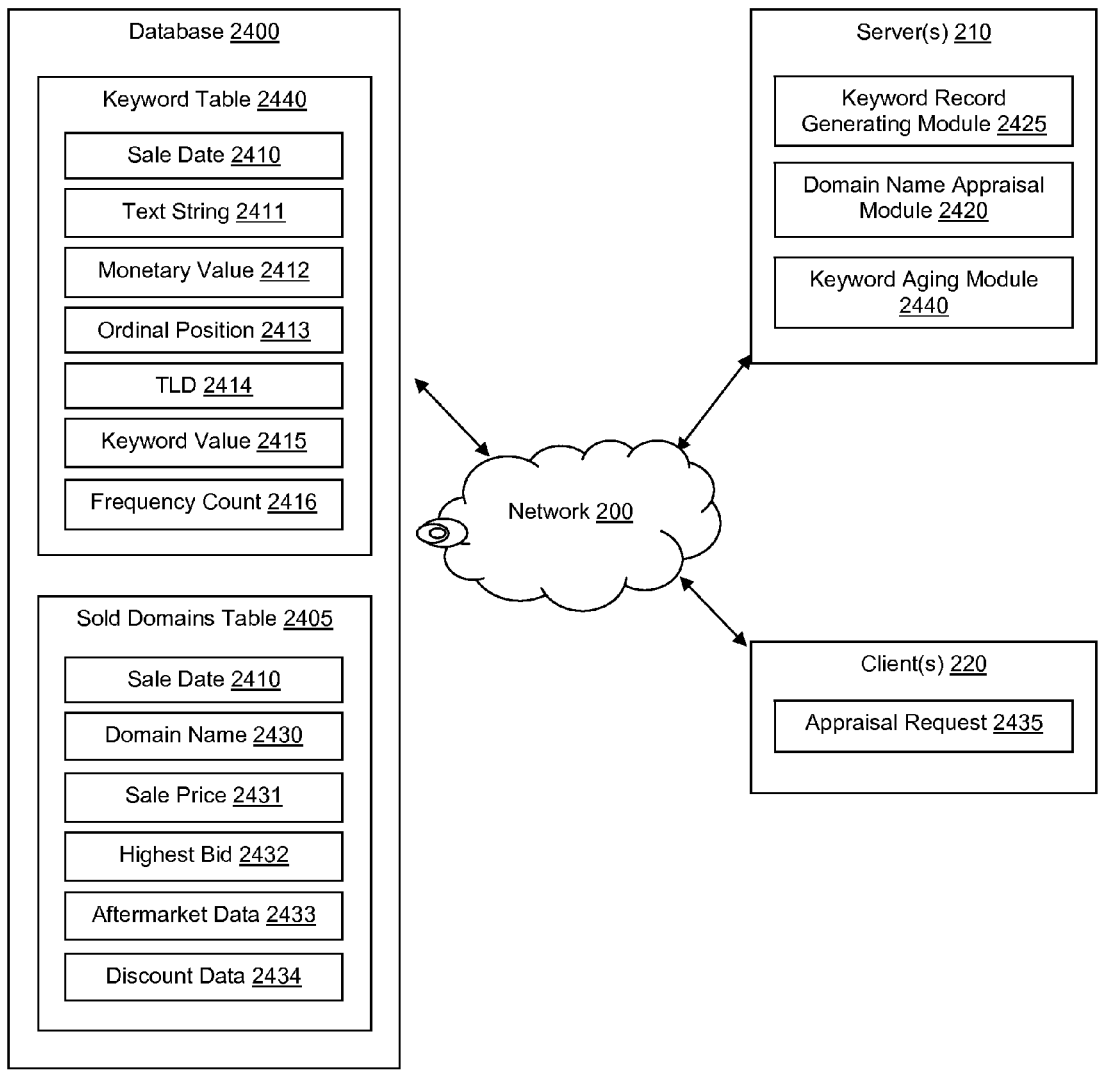
FIG. 24 illustrates a possible system for appraising a domain name.

FIG. 24 illustrates an embodiment of a system for providing an appraisal of a domain name, which may comprise a database 2400 running on one or more server computers 210 communicatively coupled to a network 200. The database 2400 (possibly operating within data storage 230) may comprise one or more data records and each of the data records may comprise a text string 2411 and a monetary value 2412 associated with the text string 2411. The one or more server(s) 210 may also be running a domain name appraisal module 2420 configured to receive an appraisal request 2425 for a domain name and identify a keyword within the domain name. The domain name appraisal module 2420 may also identify an ordinal position 2413, within the domain name, of each keyword, and a TLD 2414 of the domain name.

As a non-limiting example, a user of a client computer 220 may want to know an estimated valuation of the domain names "makeitbig.com" and "hititbig.me" and may submit an appraisal request 2435 for these domain names to the server(s) 210. In one non-limiting example embodiment, the appraisal request 2435 may be submitted via a web page on a website for a domain name aftermarket, described herein. The appraisal request 2435 may be submitted to the server(s) 210 and the domain name appraisal module 2420 may receive the request 2435 and identify, in each of the domain names, 3 keywords and each keyword's ordinal position 2413 in the domain name (respectively, in this example: "make"—position 1, "it"—position 2 and "big"—position 3, and "hit"—position 1, "it"—position 2 and "big"—position 3). The domain name appraisal module 2420 may also identify the TLDs 2414 as ".com" and ".me" respectively. In the interest of simplicity, the non-limiting examples in this disclosure will focus on the keyword appraisal for the word "big" in both of these domain names.

The domain name appraisal module 2420 may perform the procedures described herein for each of the keywords identified. Thus, if only a single keyword is identified within the domain name (e.g. if the appraisal request 2435 was for the domain name "big.com"), the keyword appraisal value 2415 generated for that domain name, as described herein, would also be the appraisal value for that domain name. However, after generating a keyword appraisal value 2415 for a first keyword identified within the domain name, the domain name appraisal module 2420 may also identify one or more additional keywords in the domain name. If one or more additional keywords are identified in the domain name, all steps described herein for determining matching records in a database 2400 and generating a keyword appraisal value 2420 for the keyword may be repeated for each of the one or more additional keywords identified within the domain name.

After the domain name appraisal module 2420 has repeated these steps for each of the identified keywords, it may add each of the generated keyword appraisal values 2415 to the appraisal value of the domain name. Thus, the total domain name appraisal value is a sum of each of the keyword appraisal values 2415. Because the appraisal value is a sum of each of the keyword appraisal values 2415, and to avoid "residual information" from previous domain appraisal calculations, a value for the appraisal may be initialized to 0 prior to identifying the keyword(s) in the domain name.

The domain name appraisal module 2420 may determine, for each of the keywords identified in the domain name, the existence of one or more matching data records in the database 2400. A matching data record may comprise one of the data records stored in the database 2400 where the text string 2411 stored in the data record matches the keyword identified in the domain name. The domain name appraisal module 2420 may determine the existence of the matching data records by generating a query for the matching data records and transmitting the query to the database 2400.

This query may request the one or more matching data records where the text string 2411 within one or more of the data records is equal to the identified keyword. The query may comprise one or more query parameters. The keyword may be one of these query parameters, since the domain name appraisal module 2420 searches the one or more data records for one or more matching data records where the keyword is equal to the text string 2411 within the matching data records.

In some embodiments, additional query parameters may include the ordinal position, in the domain name, of the keyword 2413 and the TLD 2414 of the domain name. Prior to generating the database query, the domain name appraisal module 2420 may have previously identified these elements of the domain name to be appraised as described herein. As a non-limiting example, if the one or more data records were being searched using a structured query language (SQL), the query may contain the following query, using the query parameters described herein: "SELECT text_string, monetary_value FROM keyword_table WHERE keyword="big" AND ordinal_position="3" AND top_level_domain=".com." The SQL query for the example domain name hititbig.me would be the same, except that the top level domain would equal ".net" rather than ".com."

The domain name appraisal module 2420 may receive a query result from the database 2400 in response to the query, and may further determine whether the query result contains the one or more matching data records. If the query result does not contain the matching data records (i.e. no records satisfied all of the requested query parameters), the domain name appraisal module 2420 may remove one of the query parameters and again query the database 2400 for the matching data records according to the query parameters remaining, assuming there is at least one query parameter remaining. In other words, the procedure may be repeated while the query result contains no matching data records and there is at least one query parameter.

In embodiments where the query parameters include the keyword, the ordinal position 2413 of the keyword and the TLD 2414 of the domain name being appraised, and while the query result using all of these query parameters did not contain the matching data records, the TLD 2414 may be the first query parameter removed before running the query again. If, after removing the TLD 2414 as one of the query parameters, the query result still does not contain the matching data records, the ordinal position of the keyword 2413 may be removed as one of the query parameters, so that the keyword is the only query parameter, and the query may be run again. If the query result still does not contain the matching data records, then none of the one or more data records contain a text string 2411 equal to the keyword. The keyword appraisal value for that keyword may therefore be assigned a value of 0.

Continuing the non-limiting example above, if the query result from the original query does not contain the matching data records, the SQL query may be modified to be re-run as "SELECT text_string, monetary_value FROM keyword_table WHERE keyword="big" AND ordinal_position="3." If no data records were returned in the query result, the SQL query may be modified to be re-run as "SELECT text_string, monetary_value FROM keyword_table WHERE keyword="big."

If the database query has been run using all query parameter variations and no matching data records are returned matching the requested query parameters (i.e. the text string 2411 in no data records match the keyword), the domain name appraisal module 2420 may generate a keyword monetary value with a value of 0. However, if one or more records are returned in response to one of the query parameter variations, the query results may be weighted to reflect the number of query parameters used.

This weighting may be accomplished by generating a weighted query value. The domain name appraisal module 2420 may calculate this weighted query value by determining the number of parameters in the original database query and the number of query parameters which ultimately returned the matching data record(s) comprising the keyword in the result. The number of query parameters used to query the database 2400 which ultimately returned the matching data record(s) may be divided by the number of parameters in the original query to determine the weighted query value.

Continuing the non-limiting example above, if a query result for the database query "SELECT text_string, monetary_value FROM keyword_table WHERE keyword="big" AND ordinal_position="3" AND top_level_domain=".com" did not contain the matching data record(s), the domain name appraisal module 2420 may increase the scope of the database query by searching according to the keyword and the ordinal position 2413, or in other words "SELECT text_string, monetary_value FROM keyword_table WHERE keyword="big" AND ordinal_position="3." If the query result for this modified query contained the one or more matching records, the data in the selected records may be used to identify a keyword frequency count 2416 and a keyword monetary value 2415 for the keyword, as described in more detail herein.

Because only two of the original three query parameters were used, the domain name appraisal module 2420 may generate a weighted query value comprising a quotient calculated by dividing the number of query parameters used to return the matching data records (2), by the number of original query parameters (3), making the weighted query value ⅔ or 0.66. This weighted query value may be multiplied by the keyword frequency count 2415 and the keyword monetary value 2416 for the keyword (described herein) respectively, so that both the keyword frequency count 2415 and the keyword monetary value 2416 may be reset to have only ⅔ their original value before the domain name appraisal module 2420 generates the keyword appraisal value. Thus, the domain name appraisal module 2420 may query the most specific results first, and then make subsequent queries with less specific information as needed.

If the query result, for any variation of the query parameters used in the query, contains the one or more matching data records, the domain name appraisal module 2420 may identify the keyword frequency count 2416 referred to above. The keyword frequency count 2416 may be a number of the matching data records contained in the query result where the text string 2411 in the matching data records matches the keyword. The domain name appraisal module 2420 may also identify, in each of the matching data records contained in the query result, a monetary value 2412 associated with the text string 2411. The domain name appraisal module may then identify a keyword monetary value 2415 for the keyword by calculating a sum of the monetary value 2412 for all of the matching data records contained in the query result.

Once the keyword frequency count 2416 and the keyword monetary value 2415 are identified for the keyword, the domain name appraisal module 2420 may generate a keyword appraisal value for the keyword. This keyword appraisal value may be a quotient calculated by dividing the keyword monetary value 2415 by the keyword frequency count 2416.

In various embodiments described herein, the keyword frequency count 2416 and the keyword monetary value 2415 may be weighted according to variations in the number of query parameters used in the query and/or the popularity of a sold domain name keyword as determined by the age and/or use of the sold domain name keyword. In these embodiments, the domain name appraisal module 2420 may generate a keyword appraisal value by determining whether the keyword frequency count 2416 is 1 or greater. If the keyword frequency count 2416 is less than 1, the domain name appraisal module 2420 may generate the keyword appraisal value for the keyword by multiplying, rather than dividing, the keyword monetary value 2415 by the keyword frequency count 2416. Once the keyword frequency count 2416 and the keyword monetary value 2415 are generated, the domain name appraisal module 2420 may write them to the database 2400.

In addition, once the keyword appraisal value for the keyword is generated, it may be added to the appraisal value of the domain name. In some embodiments, the domain name may consist of only a single keyword, in which case, the appraisal value of the domain name would be equal to the keyword appraisal value for the single keyword. However, if one or more additional keywords are identified within the domain name, the query for each of the additional keywords may be run, and the keyword appraisal value for each of the additional keywords may be generated and added to the appraisal value of the domain name.

Once the matching data records for all identified keywords have been retrieved, and the keyword appraisal value for each of the identified keywords has been added to the appraisal value for the domain name, the appraisal for the domain name may be transmitted to one or more client computers 220, possibly the client computer 220 which requested the appraisal of the domain name.

In some embodiments, prior to receiving the appraisal request 2435 for the domain name, a keyword record generating module 2425 running on the server(s) 210 may receive a plurality of aftermarket sales information for each of one or more sold domain names 2430 in a domain name aftermarket. A domain name aftermarket may include sales and/or re-sales of one or more domain names 2430 after their original registration. As non-limiting examples, a domain name aftermarket may include, but is not limited to, a domain name auction, such as GO DADDY AUCTIONS, a domain buy service, a service for premium domain name sales etc.

The plurality of aftermarket sales information may include, as non-limiting examples, a domain name 2430 sold in a domain name aftermarket, a sale date 2410 on which the sold domain name 2430 was sold in the domain name aftermarket and a sale price 2431 the sold domain name 2430 sold for in the domain name aftermarket 2431. In some embodiments, the aftermarket sales information may also include a domain aftermarket data 2433 used to identify the sold domain name 2430 as being sold in the domain name aftermarket, a highest bid 2432 offered for the sold domain name in the domain name aftermarket and a discount domain data 2434 identifying the sold domain name 2430 as a domain name sold at a discount in the domain name aftermarket.

In the interest of simplicity for example purposes, all sold domain name sale prices 2431 in the non-limiting examples herein are equal to the highest bid 2432. Likewise, all non-limiting examples of sold domain names 2430 are assumed to be sold in a domain name aftermarket and not sold at a discount 2434.

The keyword record generating module 2425 may be configured to write the aftermarket sales information to the database 2400 for each of the one or more domain names 2430 sold in the domain name aftermarket. In some embodiments, the aftermarket sales information for each of the domain names 2430 sold in the domain name aftermarket may be stored in an individual sold domain name data record in a sold domain names table 2405 in the database 2400. In these embodiments, the aftermarket sales information written to each sold domain name data record in the sold domain names table 2405 may include any combination of the sale date 2410, the domain name 2430 (possibly, but not mandatorily, including the TLD 2414), the sale price 2431, the domain aftermarket data 2433, the highest bid 2432 offered for the sold domain name 2430 and the discount domain data 2434. Although stored in the database, any records without domain name aftermarket data 2433, as well as any records containing the discount domain data 2434 may be excluded from any calculations used to generate the keyword frequency count 2416 and keyword monetary value 2415 for the keyword as described herein.

As a non-limiting example, the sold domain names table 2405 may include the following information:

| Date | Domain/TLD | Price | High Bid | Auction | Discount |
|---|---|---|---|---|---|
| Dec. 24, 2011 | iambig.com | $75 | $75 | True | False |
| Dec. 26, 2011 | bigburger.net | $120 | $120 | True | False |
| Dec. 27, 2011 | thebigdeal.com | $240 | $240 | True | False |
| Jan. 1, 2012 | thebigbear.com | $30 | $30 | True | False |
| Jan. 2, 2012 | bigbear.net | $50 | $50 | True | False |
| Jan. 3, 2012 | hititbig.com | $300 | $300 | True | False |
| Jan. 3, 2012 | bigofme.net | $150 | $150 | True | False |
| Jan. 4, 2012 | mybigday.com | $150 | $150 | True | False |
| Jan. 4, 2012 | gobig.com | $200 | $200 | True | False |

As previously noted, the keyword record generating module 2425 may be configured to receive this plurality of aftermarket sales information. According to different embodiments, the domain information may be received at different times and via different means.

The keyword record generating module 2425 may be configured to receive the aftermarket sales information contained within each of the sold domain name data records. In some embodiments, the keyword record generating module 2425 may be configured to query the sold domain names database table 2405 for the sold domain name data record for each of the domain names 2430 sold in the domain name aftermarket. In response to this query, the keyword record generating module 2425 may receive the aftermarket sales information contained within each of the sold domain name data records.

In other embodiments, at a conclusion of a sale of the sold domain name 2430 in the domain name aftermarket, the aftermarket sales information may be moved into a queue on the server(s) 210 and flagged to be processed and stored to said database 2400 immediately, or at a future time, depending on the queue within the server(s) 210. In these embodiments, the aftermarket sales information may be processed and stored as described herein according to the steps executed by the keyword record generating module 2425.

In other embodiments, the aftermarket sales information may be received by the keyword record generating module 2425 at a prescheduled time each day. As a non-limiting example, the one or more server(s) 210 may be configured to run a "cron" job each night at 11:00 PM to have the information in the sold domain names table 2405, and/or in a queue on the server(s) 210, sent to the keyword record generating module 2425 for processing and/or storage as described herein.

In still other embodiments, the keyword record generating module 2425 may be configured to capture the aftermarket sales information and/or run appropriate calculations immediately following a conclusion of a sale of the sold domain name 2430 in the domain name aftermarket. In these embodiments, the appropriate calculations may be run on the received aftermarket sales information and information for keywords identified within the domain name as described herein. This information may then be stored in the database 2400.

Once the keyword record generating module 2425 receives the sold domain name 2430, sale date 2410 and sale price 2431 information (as well as any other aftermarket sales information, if applicable), it may analyze the sold domain name 2430 to identify the TLD 2414 (such as .com) associated with the domain name 2430. The keyword record generating module 2425 may then identify a text string in the sold domain name 2430 which does not include the TLD 2414, to further identify one or more text strings/keywords 2411 from substrings of the domain name text string, the quantity of the one or more identified text strings/keywords 2411 and an ordinal position 2413 of the one or more identified text strings/keywords 2411 within the sold domain name text string, for each of the sold domain name keywords.

As a non-limiting example, in the domain name "thebigbear.com," the identified TLD 2414 is ".com." The sold domain name text string may be used to identify three text strings/keywords 2411: "the" has an ordinal position of 1, "big" has an ordinal position of 2 and "bear" has an ordinal position of 3.

The keyword record generating module 2425 may then generate a monetary value 2412 for each of the text strings/keywords 2411 identified in the sold domain name 2430. To generate this monetary value 2412, the keyword record generating module 2425 may identify the sale price 2431 of the sold domain name 2430 and calculate a quotient calculated by dividing the sale price 2431 by the number of text strings/keywords 2411 identified in the sold domain name 2430. The keyword record generating module 2425 may then assign the calculated monetary value 2412 to each of the text strings/keywords 2411 identified within the sold domain name 2430.

In some embodiments, the keyword record generating module 2425 may be configured to calculate the monetary value 2412 of the one or more text strings/keywords 2411 by calculating a quotient calculated by dividing the highest bid 2432 offered for the sold domain name 2430 in the domain name aftermarket by the number of text strings/keywords 2411 identified in the sold domain name 2430. This approach uses the highest bid 2432, rather than the sale price 2431, to generate the monetary value 2412 for the one or more text strings/keywords 2411 identified in the sold domain name 2430.

Once the keyword record generating module 2425 has received the plurality of aftermarket sales information and identified, in the sold domain name 2430, the top level domain 2414, one or more text strings/keywords 2411, the number of text strings/keywords 2411 and an ordinal position 2413 of each of the text strings/keywords 2411 and the monetary value 2412 associated with the text strings/keywords 2411 has been generated, the keyword record generating module 2425 may write to the database 2400, for each of the text strings/keywords 2411, the sale date 2410, one of the one or more text strings/keywords 2411, the calculated monetary value 2412, the ordinal position 2413 of the one of the one or more text strings/keywords 2411 and the top level domain 2414. The keyword record generating module 2425 may then save an individual record to the database, possibly in a keyword table 2440, for each of the text strings/keywords 2411 identified in the sold domain name 2430.

As a non-limiting example, a keyword table 2440 may be created to store one or more keyword records, each comprising the information derived from the aftermarket sales information received for one or more domain names 2430 sold in the domain name aftermarket and processed by the keyword record generating module 2425. This keyword table 2440 may be queried by the domain name appraisal module 2420 for the one or more matching data records including the keyword identified in the domain name for which the appraisal request 2435 was received.

These one or more keyword records may later be searched as part of the query for the one or more matching data records where the keyword is equal to the text string 2411 stored in the one or more keyword records. Thus, the text string 2411 stored in each of the keyword records may be equal to the keywords included as a query parameter in the query.

As a non-limiting example, the keyword table 2440 created may include the following information:

| Date | Word | Value | Position | TLD |
|---|---|---|---|---|
| Dec. 24, 2011 | i | $25 | 1 | com |
| Dec. 24, 2011 | am | $25 | 2 | com |
| Dec. 24, 2011 | big | $25 | 3 | com |
| Dec. 26, 2011 | big | $60 | 1 | net |
| Dec. 26, 2011 | burger | $60 | 2 | net |
| Dec. 27, 2011 | the | $80 | 1 | com |
| Dec. 27, 2011 | big | $80 | 2 | com |
| Dec. 27, 2011 | deal | $80 | 3 | com |
| Jan. 1, 2012 | the | $10 | 1 | com |
| Jan. 1, 2012 | big | $10 | 2 | com |
| Jan. 1, 2012 | bear | $10 | 3 | com |
| Jan. 2, 2012 | big | $25 | 1 | net |
| Jan. 2, 2012 | bear | $25 | 2 | net |
| Jan. 3, 2012 | hit | $100 | 1 | com |
| Jan. 3, 2012 | it | $100 | 2 | com |
| Jan. 3, 2012 | big | $100 | 3 | com |
| Jan. 3, 2012 | big | $50 | 1 | net |
| Jan. 3, 2012 | of | $50 | 2 | net |
| Jan. 3, 2012 | me | $50 | 3 | net |
| Jan. 4, 2012 | my | $50 | 1 | com |
| Jan. 4, 2012 | big | $50 | 2 | com |
| Jan. 4, 2012 | day | $50 | 3 | com |
| Jan. 4, 2012 | go | $100 | 1 | com |
| Jan. 4, 2012 | big | $100 | 2 | com |

As previously noted, once the keyword frequency count 2416 and the keyword monetary value 2415 are identified, the domain name appraisal module 2420 may then write the keyword frequency count 2416 and the keyword monetary value 2415 for each of the keywords identified in the domain name to the database 2400.

As a non-limiting example, on Jan. 4, 2012, two domain names may have sold, including mybigday.com and gobig.com. The appropriate information may be written to the sold domain names table 2405 and/or keywords table 2440 as reflected above. Using the information in the tables above, the following information for Jan. 4, 2012 may be written to the sold domain names table 2405, the keywords table 2440 or any related table as follows:

| Date | Word | Value | TLD | Position | Frequency |
|---|---|---|---|---|---|
| Jan. 4, 2012 | my | $50 | com | 1 | 1 |
| Jan. 4, 2012 | big | $150 | com | 2 | 2 |
| Jan. 4, 2012 | day | $50 | com | 3 | 1 |
| Jan. 4, 2012 | go | $100 | com | 1 | 1 |

A keyword aging module 2440 running on the server(s) 210 may be configured to "age" the keyword frequency count 2416 and the keyword monetary value 2415 for the keyword. This may allow the value of text strings/keywords in the disclosed procedures to ebb and flow as they do in normal language, rather than averaging the value of words over a one or multiple year period.

Some words in language are used consistently and are constantly being used while other words are introduced and become popular over a short period of time (e.g. "iphone," "google," etc.). The disclosed inventions are able to recognize these types of words and adjust the value as they become more or less popular. As a non limiting example, the passing of a popular celebrity may cause domain names containing that celebrity's name to be very highly priced for 2-3 months. However, once the fervor dies, the words in those domain names would go back to their normal level of pricing. By skewing the price towards more recent sales activity, the disclosed inventions may capture that "bubble," and then better reflect the valuation of the words once the major event is over.

To age the keyword frequency count 2416 and the keyword monetary value 2415 for the at least one text string/keyword 2411, the keyword aging module 2440 may identify a current date. To avoid "residual information" from previous keyword aging calculation values, values for an age-weighted keyword frequency count and an age-weighted keyword monetary value may be initialized to 0 prior to the domain name appraisal module 2420 calculating their respective values.

In each of the matching data records contained in the query result, the keyword aging module 2440 may identify a sale date 2410 on which the domain name 2430 from which the text string/keyword 2411 originated was sold in the domain name aftermarket. The sale date 2410 may also be used to identify the date on which the text string /keyword 2411 was identified in the domain name 2430. The keyword aging module 2440 may calculate an age of each sale date 2410, the age being identified by calculating a number of months between the sale date 2410 and the current date.

Continuing the non-limiting example above, if the database 2400 were queried for the word "big" in "makeitbig.com" to determine the keyword appraisal of "big," the query result would contain 2 matching data records from the example keyword table 2440 above where the TLD 2414 is a .com TLD and the text string/keyword 2411 is "big" in the $3^{rd}$ ordinal position 2413. These two matching data records contain sale dates 2410 of Dec. 24, 2011 and Jan. 3, 2012 respectively. The keyword aging module 2440, in this example, may determine that the current date for the query is Jan. 5, 2012, and that both sale dates 2410 are less than a month old (Dec. 24, 2011 and Jan. 3, 2012 respectively). Because the text strings/keywords 2411 are less than 1 month old (determined by subtracting, in months, the sale dates 2410 from the current date), the age of the sale date 2410 for both of these text strings/keywords 2411 would be 0 on Jan. 5, 2012 in this example.

In some embodiments, the age may be determined by analyzing only the month of the sales date 2410. In these embodiments, because the text string/keyword 2411 "big" in the data record identified from "iambig.com" is in December, as opposed to the current date (Jan. 5, 2012), which is in January in this example, the age for the Dec. 24, 2011 entry for "big" would be 1.

The keyword aging module 2440 may then calculate an age weight value to "weight" both the keyword frequency count 2416 and the keyword monetary value 2415 for the one or more matching data records containing the text string 2411 equal to the keyword. The age weight value may be generated by dividing an age weight numerator by an age weight denominator.

The age weight denominator may represent a number of years that the keyword should be aged over, so the age weight denominator may be any multiple of 12. As a non-limiting example, the keyword frequency count 2416 and keyword monetary value 2415 may be aged over 2 years, so in this example, the age weight denominator would be 24. However, in the example of "spikes" of popularity for certain keywords previously mentioned, the age weight denominator may be aged over a 1 year period to account for the keywords' short term popularity. The age weight denominator in these cases would be 12.

The age weight numerator may be calculated by subtracting the age of the sale date 2410 from the age weight denominator. If the age is greater than the age weight denominator (thereby giving the age weight numerator a negative value), the age weight value (and by extension, ultimately the keyword monetary value 2415) may automatically be assigned a value of 0.

Continuing the non-limiting example above, if the matching data record with a sale date 2410 of Jan. 3, 2012 is assumed to be 0 months old, the matching data record with a sale date 2410 of Dec. 24, 2012 is assumed to be 1 month old and the weight denominator is assumed to be 24, the weight numerator for the first matching data record would be 24 (age weight denominator−age=age weight numerator, or 24−0=24) and the weight numerator for the second matching data record would be 23 (24−1=23). The age weight for these matching data records, respectively, would then be 1 (age weight numerator/age weight denominator=age weight value, or 24/24=1) and 0.9583 (23/24=0.9583). If a third matching data record had a sale date 2410 over 24 months old, the age weight, and therefore the keyword monetary value 2415 for that keyword, would be 0.

The keyword aging module 2440 may identify a sale date keyword frequency count determined by the number of matching data records that contain that sale date 2410. This sale date frequency count may then be multiplied by the age weight value, and the product of the sale date frequency count and the age weight value may be added to the age-weighted keyword frequency count.

Likewise, the keyword aging module 2440 may calculate a sale date monetary value comprising a sum of the monetary value 2412 associated with the text string 2411 in each of the one or more matching data records in the query result which include that sale date 2410. This sale date monetary value may then be multiplied by the age weight value, and the product of the sale date monetary value and the age weight value may be added to the age-weighted keyword monetary value.

These processes may be repeated by the keyword aging module 2440 for each sale date 2410 identified in the one or more matching data records in the query result, and may also be repeated for each keyword identified in the domain name for which the appraisal was requested.

Continuing the non-limiting example above, the keyword aging module 2440 may identify a sale date 2410 in matching data records in the query results for the keyword "big." A first identified sale date 2410 may include Jan. 3, 2012, indicating the sale date 2410 of hititbig.com (the domain name 2430 that "big" was identified in). There is only one record in the example keyword table 2440 for this date 2410 that includes the text string/keyword 2411 "big" in the third ordinal position 2413 with a .com TLD 2414, so the sale date frequency count is 1 and only one sale date monetary value will be added to the age-weighted keyword monetary value for the Jan. 3, 2012 sale date 2410 in this example.

The monetary value 2412 stored in the Jan. 3, 2012 matching data record is $100 and, as seen above, the age weight value for this data record is 1 since the sale date 2410 is less than a month old. The age-weighted frequency count for the Jan. 3, 2012 matching data record is therefore 1 (sale date frequency count*age weight value=age-weighted frequency count, or 1*1=1). The age-weighted keyword monetary value for the Jan. 3, 2012 data record is 100 (sale date keyword monetary value*age weight value=age-weighted keyword monetary value, or 100*1=100). If additional data records existed with a sale date 2410 of Jan. 3, 2012, the weighted sale date frequency count and weighted sale date monetary value for each of these records would be added to the age-weighted keyword frequency count and age-weighted keyword monetary value respectively for the identified date Jan. 3, 2012.

A second identified sale date 2410 may include Dec. 24, 2011, indicating the sale date 2410 of iambig.com (the domain name 2430 that "big" was identified in). There is only one record in the example keyword table 2440 for this date 2410 that includes the text string/keyword 2411 "big" in the third ordinal position 2413 with a .com TLD 2414, so the sale date frequency count is 1 and only one sale date monetary value will be added to the age-weighted keyword monetary value for the Dec. 24, 2011 sale date 2410 in this example.

The monetary value 2412 stored in the Dec. 24, 2011 matching data record is $25 and, as seen above, the age weight value for this data record is 0.9583, since the sale date 2410 is a month old. The age-weighted frequency count for the Dec. 24, 2011 data record is therefore 0.9583 (1*0.9583=0.9583). The age-weighted monetary value for the Dec. 24, 2011 matching data record is 23.9575(25*0.9583=23.9575). If additional data records existed with a sale date 2410 of Dec. 24, 2011, the weighted sale date frequency count and weighted sale date monetary value for each of these matching data records would be added to the age-weighted keyword frequency count and age-weighted keyword monetary value respectively for the identified date Dec. 24, 2011.

Based on the data in these two example data records, the age-weighted frequency count is 1.9583 (initialized age-weighted frequency count+sale date frequency count for each identified date=age-weighted frequency count, or 0+1+0.9583=1.09583) and the age-weighted keyword monetary value is 123.9575 (initialized age-weighted keyword monetary value+sales date monetary value for each identified date=age-weighted keyword monetary value, or 0+100+23.9575=123.9575).

Prior to the domain name appraisal module 2420 generating the keyword frequency count 2416 for the keyword, the keyword aging module 2440 may be configured to replace a value assigned by the domain name appraisal module 2420 to the keyword frequency count 2416 with the age-weighted keyword frequency count generated by the keyword aging module 2440.

Likewise, prior to the domain name appraisal module 2420 generating the keyword monetary value 2415 for the keyword, the keyword aging module 2440 may be configured to replace a value assigned by the domain name appraisal module 2420 to the keyword monetary value 2415 with the age-weighted keyword monetary value generated by the keyword aging module 2440.

Continuing the example above, the keyword aging module 2440 may generate an age-weighted frequency count of 1.09583 and an age-weighted keyword monetary value of 123.9575. Prior to the domain name appraisal module 2420 generating the keyword frequency count 2416 for the keyword, the keyword aging module 2440 may replace any value used by the domain name appraisal module 2420 for the keyword frequency count 2416 with 1.09583 and any value used by the domain name appraisal module 2420 for the keyword monetary value 2415 with 123.9575.

The domain name appraisal module 2420 may then proceed to generate the keyword appraisal as described herein. Because the keyword frequency count 2416 is 1 or greater, the keyword monetary value 2415 is divided by the keyword frequency count 2416 (rather than multiplying if the keyword frequency count were less than 1), giving the example keyword "big" a keyword appraisal value in this example of $113.12 (keyword monetary value/keyword frequency count=keyword appraisal, or 123.9575/1.09583=113.117455). This keyword appraisal value may be added with the keyword appraisal value of each of the one or more additional keywords identified in the domain name to determine the appraisal value of the domain name for which the domain name appraisal was requested.

a Method for Appraising a Domain Name

Figure 25:
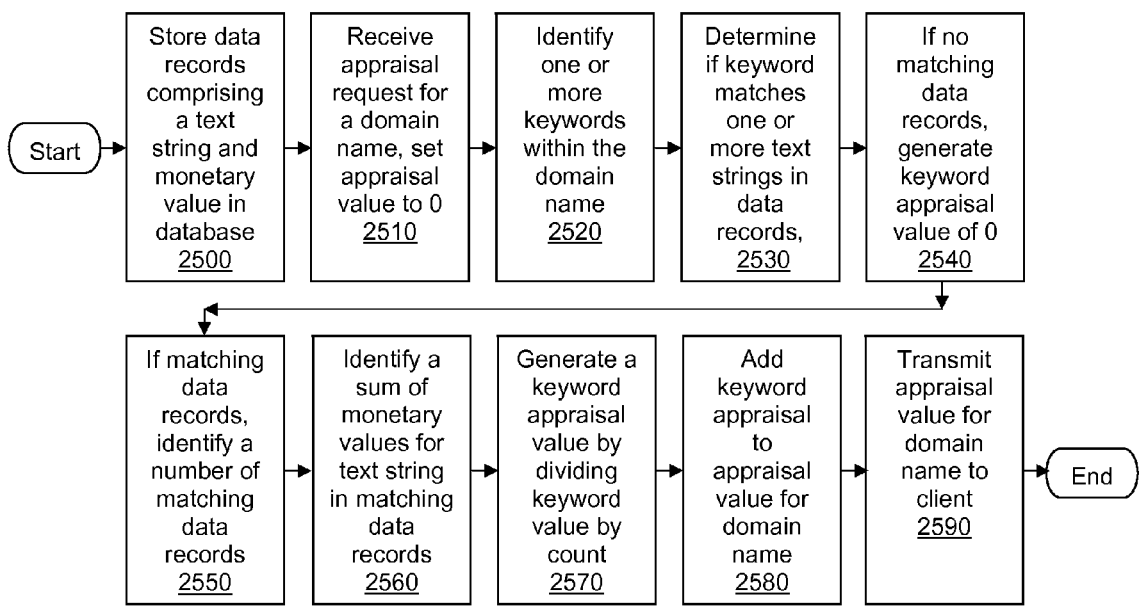
FIG. 25 is a flow diagram illustrating a possible embodiment of a method for appraising a domain name.

FIG. 25 is a flow diagram illustrating a possible embodiment of a method that may comprise storing one or more data records on a database 2400 running on one or more server computers 210 communicatively coupled to a network 200. Each of the one or more data records may comprise a text string 2411 and a monetary value 2412 associated with the text string 2411 (Step 2500).

The server(s) 210 may also receive an appraisal request 2435 for a domain name and set an appraisal value of the domain name to 0 (Step 2510); identify a keyword within the domain name (Step 2520); and determine the existence, within the database 2400, of one or more matching data records where the text string 2411 in each of the matching data records matches the keyword in the domain name (Step 2530). If the one or more matching data records do not exist within the database 2400, the server(s) 210 may generate a keyword appraisal value of 0 for the keyword (Step 2540).

However, if the one or more matching data records exist in the database 2400, the server(s) 210 may identify a keyword frequency count 2416, or in other words a number representing the amount of the matching data records (Step 2550). The server(s) 210 may then identify a keyword monetary value 2415, or in other words a sum of the monetary value 2412, associated with each text string 2411, for all of the matching data records (Step 2560). Using the identified keyword frequency count 2416 and keyword monetary value 2415, the server(s) 210 may generate a keyword appraisal value comprising a quotient calculated by dividing the keyword monetary value 2415 by the keyword frequency count 2416 (Step 2570), and add the keyword appraisal value to the appraisal value of the domain name (Step 2580). The server(s) 210 may then transmit the appraisal value of the domain name to one or more client computers 220 communicatively coupled to the network 200 (Step 2590).

In various embodiments described herein, the keyword frequency count 2416 and the keyword monetary value 2415 may be weighted according to variations in the number of query parameters used in a database query and/or the popularity of a sold domain name text string/keyword 2411 as determined by the age and/or use of the sold domain name text string/keyword 2411. In these embodiments, the server(s) 210 may generate a keyword appraisal by determining whether the keyword frequency count 2416 is 1 or greater. If the keyword frequency count 2416 is less than 1, the server(s) 210 may generate the keyword appraisal for the keyword by multiplying, rather than dividing, the keyword monetary value 2415 by the keyword frequency count 2416. Once the keyword frequency count 2416 and the keyword monetary value 2415 for the keyword are generated, the domain name appraisal module 2420 may write them to the database 2400.

Figure 26:
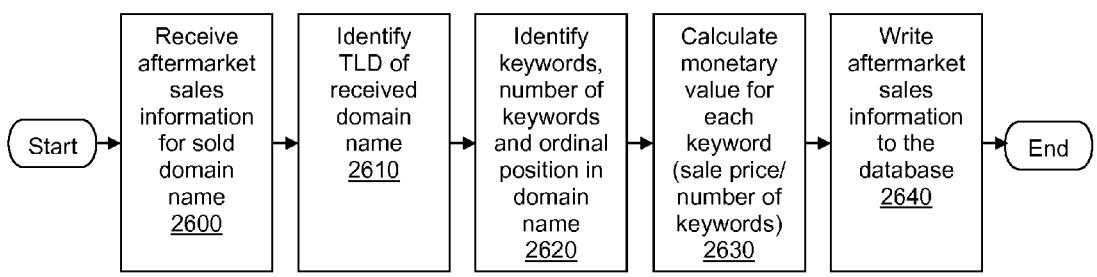
FIG. 26 is a flow diagram illustrating a possible embodiment of a method for appraising a domain name.

FIG. 26 illustrates an embodiment further comprising the steps of the server(s) 210 receiving, for each of one or more sold domain names 2430 in a domain name aftermarket, a plurality of aftermarket sales information (Step 2600). This aftermarket sales information may include a domain name 2430 sold in the domain name aftermarket; a sale date 2410 on which the sold domain name 2430 was sold in said domain name aftermarket; and a sale price 2431 for which the domain name 2430 sold in the domain name aftermarket. The server(s) 210 may then identify a TLD 2414 of the sold domain name 2430 (Step 2610) and one or more text strings/keywords 2411, a number of text strings/keywords 2411 and an ordinal position 2413 of each of the text strings/keywords 2411 in the sold domain name 2430 (Step 2620).

Having identified this aftermarket sales information (Step 2600), as well as various aspects of the sold domain name 2430 (Steps 2610-2620), the server(s) 210 may then generate a monetary value 2412 for each of said one or more text strings/keywords 2411. This monetary value 2412 may be a quotient calculated by dividing the sale price 2431 by the number of text strings/keywords 2411 (Step 2630) in the domain name. The server(s) 210 may then write the sale date 2410, the text string (i.e. one of the one or more keywords) 2411, the monetary value 2412, the ordinal position 2413 of the text string/keyword 2411 and the TLD 2414 to the database 2400 for each of the one or more text strings/keywords 2411 (Step 2640).

The aftermarket sales information may also include: a domain aftermarket data 2433 identifying the sold domain name 2430 as being sold in said domain name aftermarket; a highest bid 2432 offered in the domain name aftermarket for the sold domain name 2430; and a discount domain data 2434 identifying the sold domain name 2430 as having been sold at a discount in said domain name aftermarket. The server(s) 210 may also write this additional aftermarket sales information to the database 2400 for each of the text strings/keywords 2411 and/or sold domain names 2430. In these and other embodiments, the server(s) 210 may generate the monetary value 2412 for each of the text strings/keywords 2411 by dividing the highest bid 2432, rather than the sale price 2431, by the number of text strings/keywords 2411 in the sold domain name 2430. In these and other embodiments, if the server(s) 210 determine that the one or more matching data records exist in the database, any of the matching data records which include the discount domain data 2434 may be excluded from the query result.

The aftermarket sales information may be received from a sold domain names table 2405 in the database 2400, which may include a sold domain name data record for each of the one or more sold domain names 2430, each of which may, in turn, include the aftermarket sales information for that sold domain name 2430. The server(s) 210 may also receive the aftermarket sales information from a queue of aftermarket sales information flagged within the server(s) 210 to be processed and written to the database 2400 according to the steps performed by the keyword record generating module 2425 as disclosed herein. In either of these embodiments, the aftermarket sales information may be received by the server(s) 210 at a prescheduled time each day as disclosed herein. The server(s) 210 may also receive the aftermarket sales information at the conclusion of a sale of the sold domain name 2430 in the domain name aftermarket.

Figure 27:
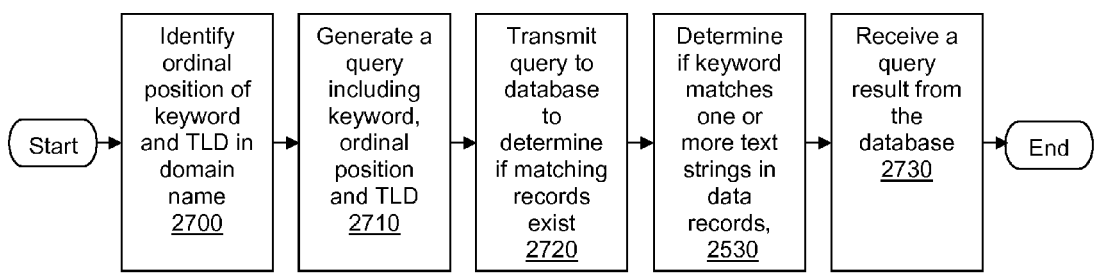
FIG. 27 is a flow diagram illustrating a possible embodiment of a method for appraising a domain name.

FIG. 27 illustrates an embodiment further comprising the steps of the server(s) 210 identifying an ordinal position of the keyword in the domain name for which the appraisal request was made, and a TLD of the domain name (Step 2700). With this information identified, the server(s) 210 may generate a query for the one or more matching data records. The query may be made up of one or more query parameters including the keyword, the ordinal position 2413 of the keyword in said domain name and the TLD 2414 (Step 2710). The server(s) 210 may then transmit the query to the database 2400 to determine if the matching data records exist in the database 2400 (Step 2720). The server(s) 210 may then receive a query result from the database 2400 (Step 2730).

In these embodiments, the domain name appraisal module 2420 may receive a query result from the database 2400 in response to the query, and may further determine whether the query result contains the one or more matching data records. If the query result does not contain the matching data records (i.e. no records satisfied all of the requested query parameters), the domain name appraisal module 2420 may remove one of the query parameters and again query the database 2400 for the matching data records according to the query parameters remaining, assuming there is at least one query parameter remaining. In other words, the procedure may be repeated while the query result contains no matching data records and there is at least one query parameter.

In embodiments where the query parameters include the keyword, the ordinal position 2413 of the keyword and the TLD 2414 of the domain name being appraised, and whle the query result using all of these query parameters did not contain the matching data records, the TLD 2414 may be the first query parameter removed before running the query again. If, after removing the TLD 2414 as one of the query parameters, the query result still does not contain the matching data records, the ordinal position of the keyword 2413 may be removed as one of the query parameters, so that the keyword is the only query parameter, and the query may be run again. If the query result still does not contain the matching data records, then none of the one or more data records contain a text string 2411 equal to the keyword. The keyword appraisal value for that keyword may therefore be assigned a value of 0.

This weighting may be accomplished by generating a weighted query value. The domain name appraisal module 2420 may calculate this weighted query value by determining the number of parameters in the original database query and the number of query parameters which ultimately returned the matching data record(s) comprising the keyword in the result. The number of query parameters used to query the database 2400 which ultimately returned the matching data record(s) may be divided by the number of parameters in the original query to determine the weighted query value.

If the database query has been run using all query parameter variations and no matching data records are returned matching the requested query parameters (i.e. the text string 2411 in no data records match the keyword), the domain name appraisal module 2420 may generate a keyword monetary value 2415 with a value of 0. However, if one or more records are returned in response to one of the query parameter variations, the query results may be weighted to reflect the number of query parameters used.

This weighting may be accomplished by generating a weighted query value. The domain name appraisal module 2420 may calculate this weighted query value by determining the number of parameters in the original database query and the number of query parameters which ultimately returned the matching data record(s) comprising the keyword in the result. The number of query parameters used to query the database 2400 which ultimately returned the matching data record(s) may be divided by the number of parameters in the original query to determine the weighted query value. This weighted query value may be multiplied by the keyword frequency count 2415 and the keyword monetary value 2416 for the keyword. Thus, the domain name appraisal module 2420 may query the most specific results first, and then make subsequent queries with less specific information as needed.

Figure 28:
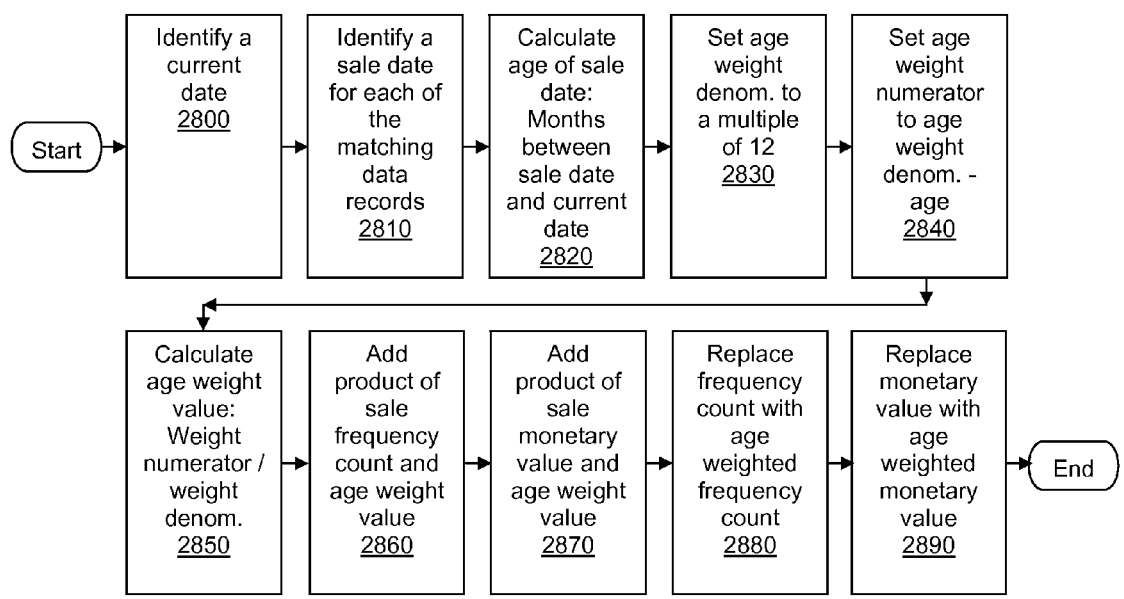
FIG. 28 is a flow diagram illustrating a possible embodiment of a method for appraising a domain name.

FIG. 28 illustrates an embodiment further comprising the steps of the server(s) 210 identifying a current date (Step 2800) and further identifying, in each of the matching data records, a sale date 2431 on which said text string/keyword 2411 was identified in a sold domain name 2430. (Step 2810). To avoid "residual information" from previous keyword aging calculation values, values for an age-weighted keyword frequency count and an age-weighted keyword monetary value may be initialized to 0 prior to the domain name appraisal module 2420 calculating their respective values.

For each sale date 2410 identified in the matching data records, the server(s) 210 may calculate an age of the sale date 2410, or a number of months between the current date and the sale date 2410 (Step 2820). With the age calculated, the server(s) 210 may calculate an age weight value comprising an age weight numerator divided by an age weight denominator (Step 2850). The age weight denominator may be a multiple of 12 (e.g. 12, 24, 36, etc.—Step 2830) and the age weight numerator may be calculated by subtracting the age from said age weight denominator (Step 2840). If the age of the sale date 2410 is greater than the age weight denominator, the age weight value may be 0.

The server(s) 210 may then identify a sale date frequency count comprising a number of the matching data records which include the sale date 2410 and add a product of the sale date frequency count and the age weight value to the age-weighted keyword frequency count (Step 2860). Likewise, the server(s) 210 may identify a sale date monetary value comprising a sum of the monetary value 2412 associated with the text string/keyword 2411 for all of the matching data records and add a product of the sale date monetary value and the age weight value to the age-weighted keyword monetary value (Step 2870).

The server(s) 210 may then replace a value assigned to the keyword frequency count 2416 with the age-weighted keyword frequency count (Step 2880) and replace a value assigned to the keyword monetary value 2415 with said age-weighted keyword monetary value (Step 2890). The server(s) may then use these substituted values to generate a keyword appraisal value (Step 2570). This keyword appraisal value may, in turn, be used to calculate the appraisal value for the domain name for which the appraisal request was made.

The additional steps included in the embodiments illustrated in FIGS. 25-28 are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
    A) a database running on one or more server computers communicatively coupled to a network, said database comprising one or more data records, each of said one or more data records comprising:
       i) a text string; and
       ii) a monetary value associated with said text string;
    B) said one or more server computers running a domain name appraisal module configured to:
       i) receive an appraisal request for a domain name;
       ii) set an appraisal of said domain name to 0;
       iii) identify a keyword within said domain name;
       iv) determine the existence, within said database, of one or more matching data records wherein said text string matches said keyword;
       v) responsive to a determination that said one or more matching data records do not exist within said database, generate a keyword appraisal value of 0;
       vi) responsive to a determination that said one or more matching data records exist within said database:
          a) identify a keyword frequency count comprising a quantity of said one or more matching data records;
          b) identify a keyword monetary value comprising a sum of said monetary value, associated with said text string, for all of said one or more matching data records;
          c) generate said keyword appraisal value comprising a quotient calculated by dividing said keyword monetary value by said keyword frequency count;
          d) add said keyword appraisal value to said appraisal value of said domain name; and
       vii) transmit said appraisal value to one or more client computers communicatively coupled to said network.

2. The system of claim 1 wherein said domain name appraisal module is further configured to:
    i) identify one or more additional keywords within said domain name;
    ii) for each of said one or more additional keywords, repeat steps iv)-vi) d).

3. The system of claim 1, further comprising a keyword record generating module running on said one or more server computers and configured to:
    i) receive, for each of one or more sold domain names in a domain name aftermarket, a plurality of aftermarket sales information comprising:
       a) a sold domain name sold in said domain name aftermarket;
       b) a sale date on which said sold domain name was sold in said domain name aftermarket; and
       c) a sale price for which said sold domain name sold in said domain name aftermarket;
    ii) identify, in said sold domain name: a top level domain, one or more keywords, a quantity of said one or more keywords and an ordinal position of each of said one or more keywords;
    iii) generate, for each of said one or more keywords, said monetary value comprising a quotient calculated by dividing said sale price by said quantity of said one or more keywords; and
    iv) write to said database, for each of said one or more keywords:
       a) said sale date;
       b) said text string comprising one of said one or more keywords;
       c) said monetary value;
       d) said ordinal position, in said sold domain name, of said one of said one or more keywords; and
       e) said top level domain.

4. The system of claim 3, wherein said keyword record generating module receives said plurality of aftermarket sales information from a sold domain names table in said database, said sold domain names table comprising a sold domain name data record for each of said one or more sold domain names and said sold domain name data record comprising said plurality of aftermarket sales information.

5. The system of claim 3, wherein said keyword record generating module receives said plurality of aftermarket sales information from a queue of aftermarket sales information flagged within said one or more servers to be processed by said keyword record generating module according to steps i)-vi) and written to said database by said keyword record generating module according to step vii).

6. The system of claim 3, wherein said keyword record generating module receives said plurality of aftermarket sales information each day at a prescheduled time.

7. The system of claim 3, wherein said keyword record generating module receives said plurality of aftermarket sales information at a conclusion of a sale of said sold domain name in said domain name aftermarket.

8. The system of claim 3, wherein:
    i) said plurality of aftermarket sales information further comprises:
       a) a domain aftermarket data identifying said sold domain name as being sold in said domain name aftermarket;
       b) a highest bid offered, in said domain name aftermarket, for said sold domain name; and
       c) a discount domain data identifying said sold domain name as having been sold at a discount in said domain name aftermarket; and
    ii) said keyword record generating module is further configured to write, to said database: said domain aftermarket data; said highest bid offered; and said discount domain data.

9. The system of claim 8, wherein said keyword record generating module is configured to generate said monetary value by calculating a quotient calculated by dividing said highest bid offered by said quantity of said one or more keywords.

10. The system of claim 8, wherein, responsive to a determination that said one or more matching data records exist within said database, said domain name appraisal module is further configured to exclude, from said one or more matching data records, any of said one or more data records comprising said discount domain data.

11. The system of claim 2, wherein said domain name appraisal module is further configured to:
- i) identify:
  - a) an ordinal position, in said domain name, of said keyword; and
  - b) a top level domain of said domain name;
- ii) generate a query for said one or more matching data records, said query comprising one or more query parameters comprising:
  - a) said keyword;
  - b) said ordinal position, in said domain name, of said keyword; and
  - c) said top level domain.
- iii) transmit said query to said database;
- iv) receive a query result from said database.

12. The system of claim 11, wherein said domain name appraisal module is further configured to:
- i) while said query result does not comprise said one or more matching data records, and while a quantity of said one or more query parameters is greater than 0:
  - a) remove one of said one or more query parameters; and
  - b) query said database for said one or more matching data records according to said one or more query parameters remaining;
- ii) responsive to a determination that said query result comprises said one or more matching data records:
  - a) generate a weighted query value comprising a quotient of said quantity of said one or more query parameters remaining, divided by 3; and
  - b) prior to generating said keyword appraisal:
    - 1) reset a value of said keyword frequency count to a product of said keyword frequency count and said weighted query value; and
    - 2) reset a value of said keyword monetary value to a product of said keyword monetary value and said weighted query value.

13. The system of claim 12, wherein said domain name appraisal module is further configured to remove said top level domain as said one of said one or more query parameters prior to removing said ordinal position of said keyword as said one of said one or more query parameters.

14. The system of claim 12, further comprising a keyword aging module configured to, prior to said domain name appraisal module generating said keyword appraisal:
- i) identify a current date;
- ii) set an age-weighted keyword frequency count and an age-weighted keyword monetary value to 0;
- iii) identify, in each of said one or more matching data records, a sale date on which said text string was identified in a sold domain name;
- iv) for each said sale date identified:
  - a) calculate an age of said sale date, said age comprising a number of months between said current date and said sale date;
  - b) calculate an age weight value comprising an age weight numerator divided by an age weight denominator, wherein:
    - 1) said age weight denominator comprises a multiple of 12;
    - 2) said age weight numerator comprises said age subtracted from said age weight denominator; and
    - 3) said age weight value comprises a value of 0 if said age is greater than said age weight denominator;
  - c) identify a sale date frequency count comprising a quantity of said one or more matching data records comprising said sale date;
  - d) add a product of said sale date frequency count and said age weight value to said age-weighted keyword frequency count;
  - e) identify a sale date monetary value comprising a sum of said monetary value associated with said text string for all of said one or more matching data records comprising said sale date;
  - f) add a product of said sale date monetary value and said age weight value to said age-weighted keyword monetary value;
- v) replace a value assigned to said keyword frequency count with said age-weighted keyword frequency count; and
- vi) replace a value assigned to said keyword monetary value with said age-weighted keyword monetary value.

15. The system of claim 14, wherein said age weight denominator is 24.

16. The system of claim 14, wherein said age weight denominator is 12.

17. The system of claim 1, wherein said domain name appraisal module generates said keyword appraisal by:
- i) determining whether said keyword frequency count is 1 or greater;
- ii) responsive to a determination that said keyword frequency count is not 1 or greater, generating said keyword appraisal by multiplying said keyword monetary value by said keyword frequency count.

18. The system of claim 1, wherein said domain name appraisal module is further configured to write said keyword frequency count and said keyword monetary value to said database.

\* \* \* \* \*